(12) United States Patent
Ito et al.

(10) Patent No.: US 10,284,628 B2
(45) Date of Patent: May 7, 2019

(54) DISTRIBUTION METHOD AND RESOURCE ACQUISITION METHOD

(71) Applicant: FUJITSU LIMITED, Kawasaki-shi, Kanagawa (JP)

(72) Inventors: Hidenobu Ito, Kawasaki (JP); Koichi Yasaki, Kawasaki (JP); Kazuaki Nimura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 702 days.

(21) Appl. No.: 14/600,613

(22) Filed: Jan. 20, 2015

(65) Prior Publication Data

US 2015/0264118 A1 Sep. 17, 2015

(30) Foreign Application Priority Data

Mar. 12, 2014 (JP) ................................. 2014-048828

(51) Int. Cl.
G06F 16/16 (2019.01)
H04L 29/08 (2006.01)
H04L 29/06 (2006.01)

(52) U.S. Cl.
CPC ............ *H04L 67/10* (2013.01); *G06F 16/162* (2019.01); *H04L 67/02* (2013.01); *H04L 67/06* (2013.01); *H04L 67/34* (2013.01); *H04L 67/42* (2013.01)

(58) Field of Classification Search
CPC ......... H04L 67/02; H04L 67/06; H04L 67/32; H04L 67/34; H04L 67/42; G06F 17/30; G06F 17/301; G06F 17/30117; G06F 16/162

USPC ......................................................... 709/203
See application file for complete search history.

(56) References Cited

U.S. PATENT DOCUMENTS

| | | | |
|---|---|---|---|
| 6,157,948 A * | 12/2000 | Inoue ........................ | G06F 8/61 382/232 |
| 6,931,588 B1 | 8/2005 | Nakano | |
| 2001/0051916 A1 | 12/2001 | Shiomi et al. | |
| 2005/0289588 A1* | 12/2005 | Kinnear ................... | H04N 5/76 725/35 |
| 2015/0006662 A1* | 1/2015 | Braness .............. | H04L 65/4084 709/213 |
| 2015/0082299 A1* | 3/2015 | Kobayashi ................ | G06F 8/61 717/174 |
| 2015/0128293 A1* | 5/2015 | Hitomi .................... | H04L 65/60 726/29 |

(Continued)

FOREIGN PATENT DOCUMENTS

| JP | 60-205650 | 10/1985 |
|---|---|---|
| JP | 2000-105773 | 4/2000 |

(Continued)

OTHER PUBLICATIONS

JPOA—Office Action dated Oct. 17, 2017 issued with respect to the basic Japanese Patent Application No. 2014-048828, with full machine translated office action.

*Primary Examiner* — Tonia L Dollinger
*Assistant Examiner* — Adam A Cooney
(74) *Attorney, Agent, or Firm* — Fujitsu Patent Center

(57) ABSTRACT

A distribution method is executed by a computer. The distribution method includes dividing a program in response to an acquisition request to acquire the program received from a terminal device connected via a network; and transferring the divided program to the terminal device.

29 Claims, 32 Drawing Sheets

(56) References Cited

U.S. PATENT DOCUMENTS

2015/0281308 A1* 10/2015 Liao .................... H04L 65/604
709/203

FOREIGN PATENT DOCUMENTS

| JP | 2002-49500 | 2/2002 |
|----|------------|--------|
| WO | 98/11723   | 3/1998 |

* cited by examiner

FIG.20

```
{
  "name": "My App",
  "description": "This is a sample app.",
  "launch_path": "/",
  "icons": {
    "128": "/img/icon-sample.png"
  },
  "developer": {
    "name": "Developer's name",
    "url": "http://developer-site.example.com"
  },
  "default_locale": "en",
  "package": {
    "type": "partial",
    "patial_id": "1234",
    "partial_size": "3"
  }
}
```

- 8e:
  - →NAME OF APPLICATION
  - →DESCRIPTION OF APPLICATION
  - →ENTRY POINT OF APPLICATION
  - →LOCATION OF ICON FILE
- 8f:
  - →DEVELOPER INFORMATION
- 8g:
  - →STANDARD LANGUAGE
  - →ATTRIBUTE INFORMATION OF PACKAGE
  - →PACKAGE TYPE : full or partial
  - →UNIQUE ID FOR IDENTIFYING PACKAGE
  - →DIVISION NUMBER OF PACKAGE

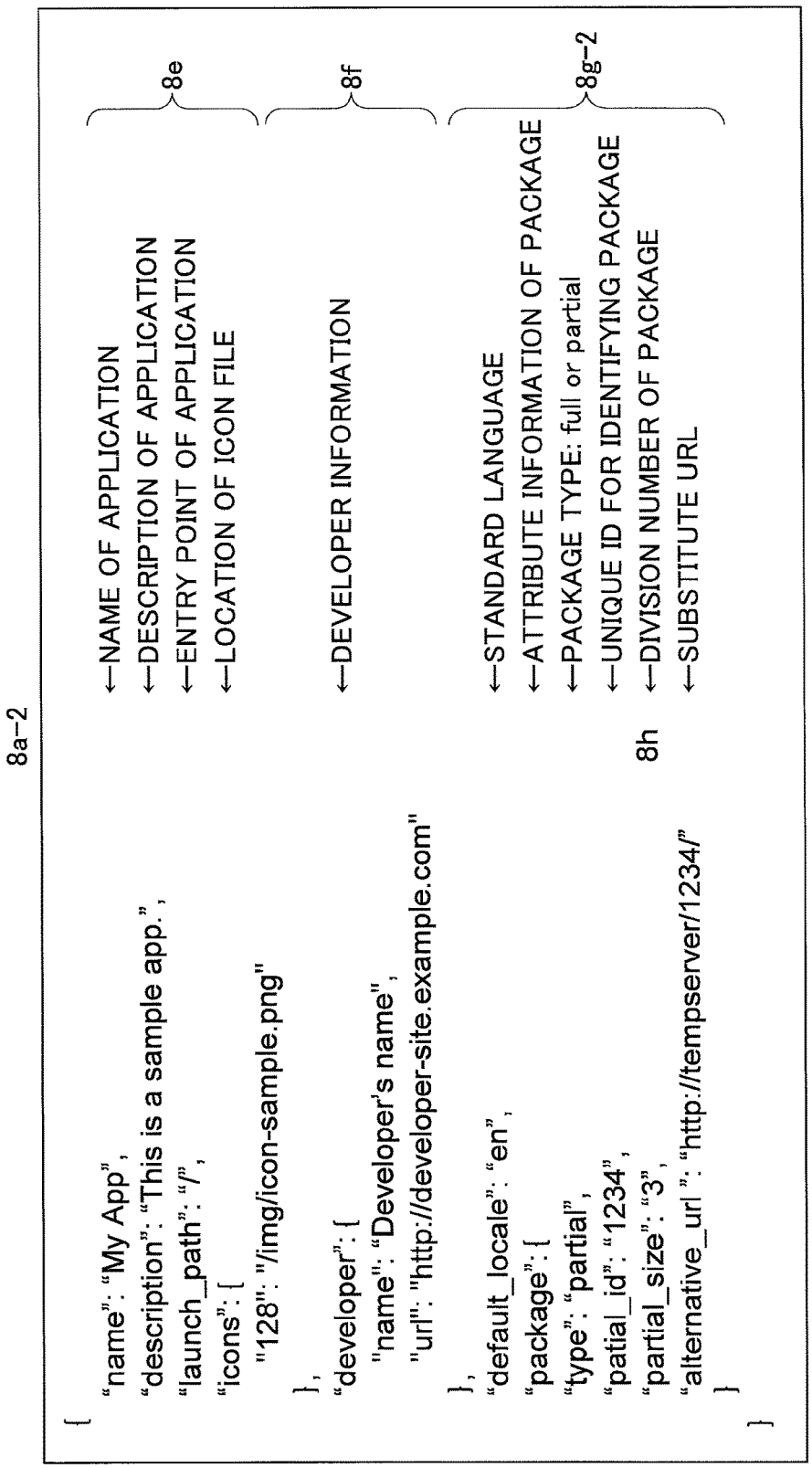

FIG.23A

HTTP GET get_package?appId=1234&token=abcd&network=lte

FIG.23B

HTTP GET get_package?appId=1234&token=abcd&timelimit=10s

FIG.27

| APPLICATION ID | TIME | DIVISION STATE | ACTIVATION STATE | ACCESSED RESOURCE | RESOURCE TYPE |
|---|---|---|---|---|---|
| 1234 | 2013/12/17:11:11:11:200 | 1 | | | |
| | 2013/12/17:11:11:12:845 | | ACTIVATE | | |
| | 2013/12/17:11:11:12:923 | | | index.html | L |
| | 2013/12/17:11:11:13:073 | | | img/icon-sample.png | L |
| | 2013/12/17:11:11:59:981 | | | example4.html | R |
| | ... | ... | ... | ... | ... |
| | 2013/12/17:11:12:34:588 | 1,2 | | | |
| | 2013/12/17:11:12:40:103 | | | example2.html | L |
| | ... | ... | ... | ... | ... |
| | 2013/12/17:11:13:46:444 | 1,2,3 | | | |
| | 2013/12/17:11:14:03:048 | | | example3.html | L |
| | ... | ... | ... | ... | ... |
| | 2013/12/17:11:22:11:316 | | END | | |

69 / 69a / 69b

DISTRIBUTION METHOD AND RESOURCE ACQUISITION METHOD

CROSS-REFERENCE TO RELATED APPLICATION

This patent application is based upon and claims the benefit of priority of the prior Japanese Patent Application No. 2014-048828 filed on Mar. 12, 2014, the entire contents of which are incorporated herein by reference.

FIELD

The embodiments discussed herein are related to immediately executing programs that are divided and transferred.

BACKGROUND

Conventionally, there is proposed a technology of dividing and transferring programs via a network, such that the programs are executed as the execution parts arrive. Furthermore, there is proposed a technology of receiving programs that have been divided, starting the execution while the programs are being received, and waiting if the reference part has not yet arrived.

Patent Document 1: Japanese Examined Patent Application Publication No. H3-047541
Patent Document 2: International Publication No. 98/011723

In recent years, various types of personal computers (PC) have been in widespread use, such as a desktop computer, a laptop computer, a palm computer, and a tablet terminal. By developing applications that do not depend on the platform such as the OS (Operating System) of these various PCs (applications that operate on multi-platforms), the user is able to use the same application without considering the difference in platforms, even when various PCs are used.

When developing such applications that operate on multi-platforms, it is mainstream to use a World Wide Web technology described in HTML (HyperText Markup Language). Applications described in HTML are referred to as Web applications. Among these applications, there is a Web application called "Packaged Web App". Specifically, in the HTML specification for which a draft has been open to the public starting in 2008, there is defined a specification for operating web applications on-line, which are the "Packaged Web Apps".

"Packaged Web Apps" is one type of the applications operating on browsers, which resides at the client after being downloaded from the server, and operates off-line on the client side.

Hereinafter, "Packaged Web Apps" is simply referred to as an application.

Typically, an application is used by being packaged into a single file by archiving a group of files needed for an operation, and therefore, it cannot be executed until the entire package is downloaded. Meanwhile, since a web application used on-line is not packaged, it may be executed as soon as a part of the files constituting the web application is loaded in a browser. Therefore, a user who is accustomed to using on-line web applications will expect to immediately use "Packaged Web Apps" which operates off-line.

However, when the data size of an application is large, it takes much time to download the application, and therefore the user has to wait until the entire package is completely downloaded in order to execute the application.

SUMMARY

According to an aspect of the embodiments, a distribution method is executed by a computer, the distribution method including dividing a program in response to an acquisition request to acquire the program received from a terminal device connected via a network; and transferring the divided program to the terminal device.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 20 illustrates a data configuration of manifest information of a first resource acquisition method;
FIG. 21 illustrates a data configuration of manifest information in a second resource acquisition method;
FIGS. 23A and 23B illustrate examples of specifications of the package size according to a second modification example.

FIG. 27 illustrates a data configuration example of an access log DB of the terminal device;

DESCRIPTION OF EMBODIMENTS

Figure 1:
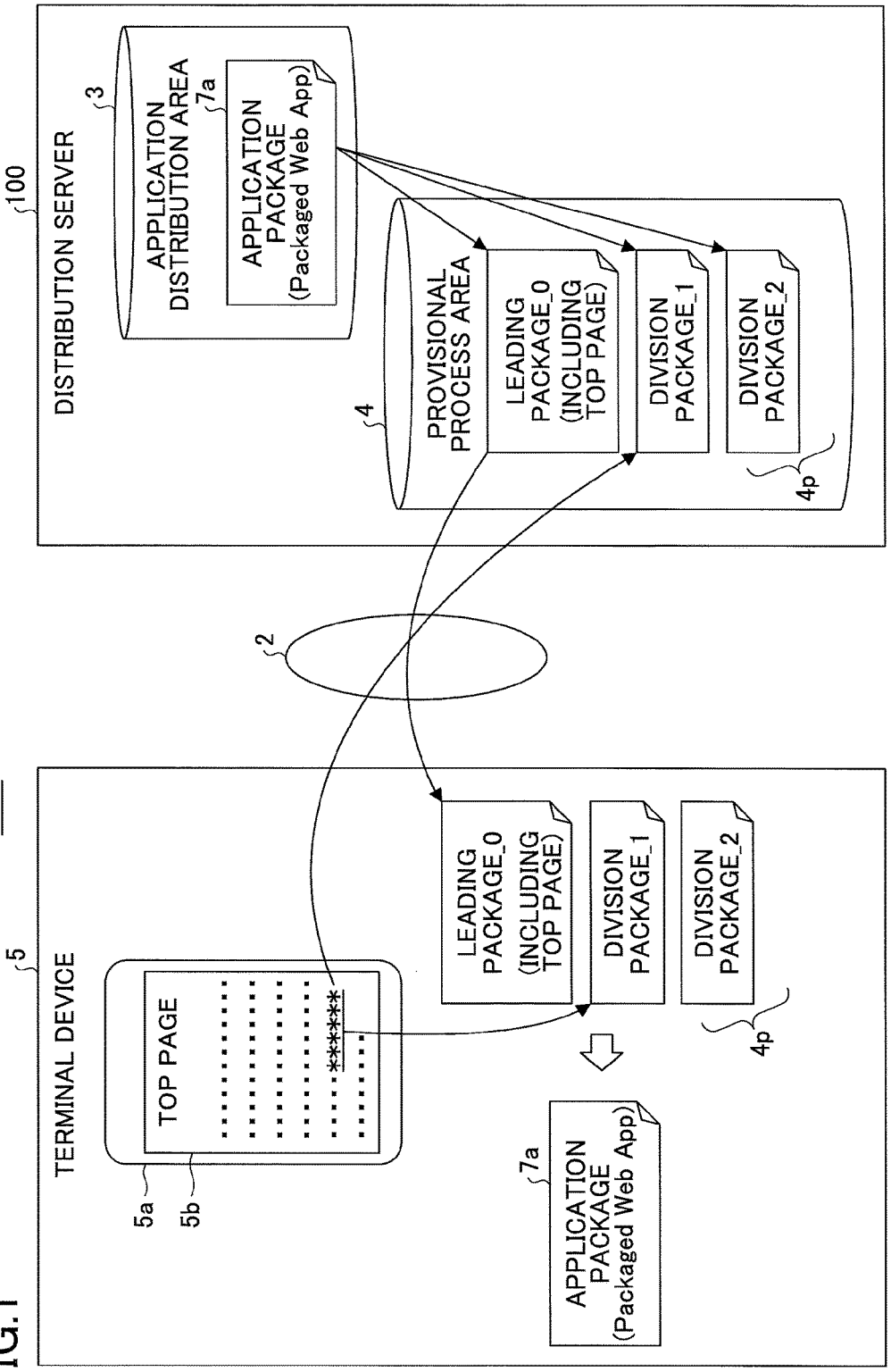
FIG. 1 illustrates the overview of a distribution system.

Preferred embodiments of the present invention will be explained with reference to accompanying drawings.
Embodiments A description is given of a distribution system 1000 according to the present embodiment. FIG. 1 illustrates the overview of the distribution system 1000. In FIG. 1, the distribution system 1000 includes at least one terminal device 5 and a distribution server 100. The terminal device 5 and the distribution server 100 are connected via a network 2 such as the Internet or an in-house LAN.

The terminal device 5 is an information processing device, which may execute applications according to resources such as HTML (HyperText Markup Language), CSS (Cascading Style Sheets), JavaScript (registered trademark), and app manifest. The terminal device 5 may be a mobile communication device such as a mobile phone.

The distribution server 100 includes an application distribution area 3 for storing an application package 7a, and a provisional process area 4 for temporarily storing division packages 4p obtained by dividing and packaging an application. The application distribution area 3 may be managed by a server for distributing applications, which is separate from the distribution server 100.

The application package 7a is a package formed by integrating applications according to the resources described above into a ZIP file. The application package 7a is a download type application, which may be downloaded into the terminal device 5 and then executed off-line in the terminal device 5, and is referred to as "Packaged Web App". Meanwhile, a web application that operates on-line in a conventional browser is referred to as "Hosted Web App".

In the distribution system 1000, the terminal device 5 downloads the application by the division packages 4p via the Internet 2. The terminal device 5 acquires information in the package when the leading package_0 is received, an icon expressing the application is displayed on a display screen 5a of the terminal device 5, and the application becomes executable.

When the user selects the icon, the application is executed by the leading package_0 including a top page 5b. When a page that is included by a division package_1 is requested while the application is operating according to the leading package_0, the terminal device 5 executes the requested page by the division package_1 in the device itself if the division package_1 is present in the device itself. If the division package_1 is not present in the device itself, the terminal device 5 sends a request to download of the division package_1 to the distribution server 100.

When the download of all of the division packages 4p is completed, the terminal device 5 assembles the division packages 4p and restores the application package 7a.

Therefore, in the present embodiment, the terminal device 5 is able to execute the application without waiting for the download of all of the division packages 4p to be completed.

Figure 2:
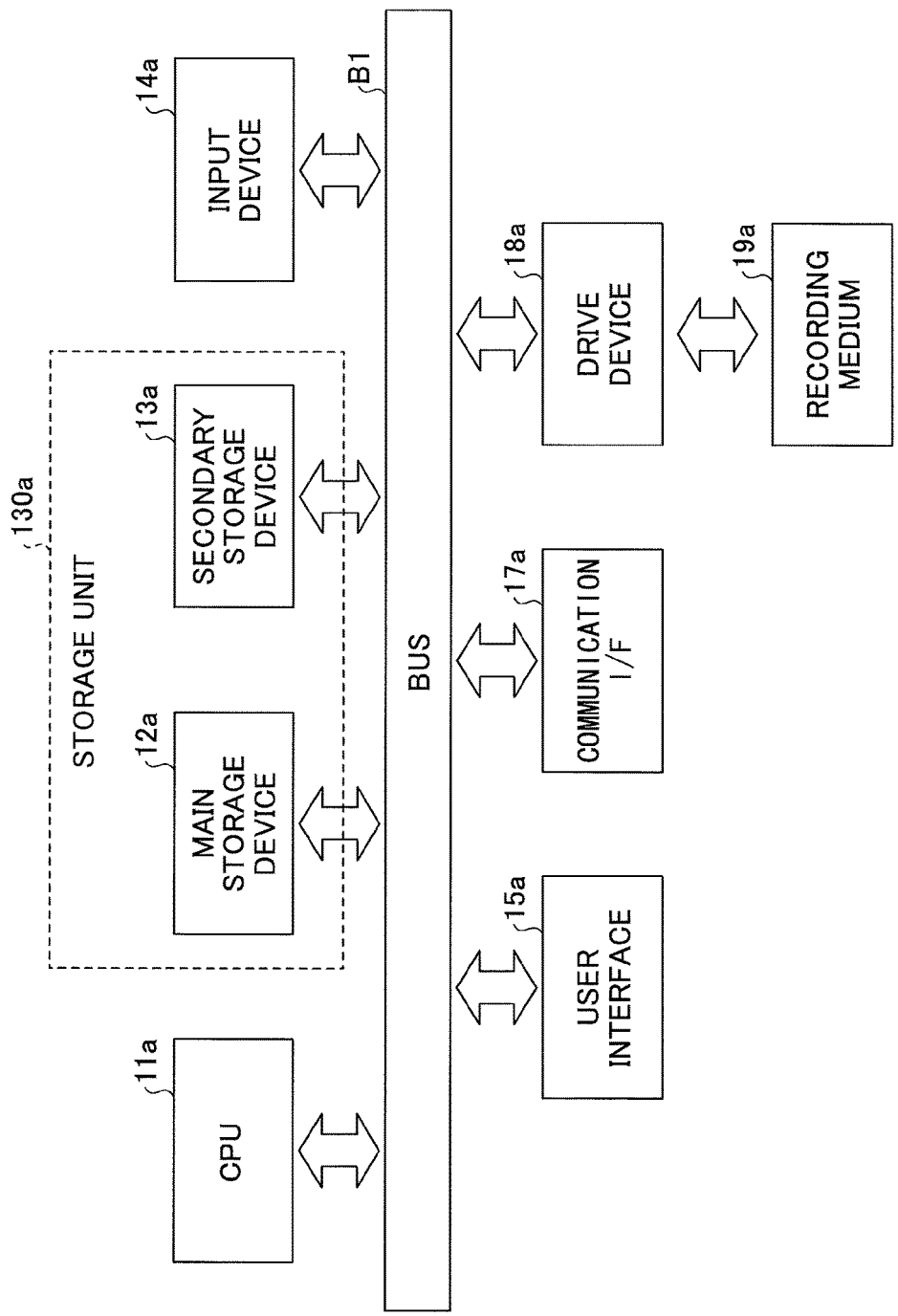
FIG. 2 illustrates an example of a hardware configuration of a distribution server.

The distribution server 100 according to the present embodiment has a hardware configuration as illustrated in FIG. 2. FIG. 2 illustrates an example of a hardware configuration of the distribution server 100. In FIG. 2, the distribution server 100 is a terminal controlled by a computer, including a CPU (Central Processing Unit) 11a, a main storage device 12a, a secondary storage device 13a, an input device 14a, a user interface 15a, a communication I/F (interface) 17a, and a drive device 18a, which are connected to a bus B1.

The CPU 11a controls the distribution server 100 according to programs stored in the main storage device 12a. As the main storage device 12a, a RAM (Random Access Memory), and a ROM (Read Only Memory), etc., may be used, and the main storage device 12a stores or temporarily stores programs executed by the CPU 11a, data needed for processes by the CPU 11a, and data obtained by processes by the CPU 11a.

As the secondary storage device 13a, a HDD (Hard Disk Drive), etc., may be used, and the secondary storage device 13a stores data such as programs for executing various processes. As some of the programs stored in the secondary storage device 13a are loaded in the main storage device 12a and are executed by the CPU 11a, where various processes are described. A storage unit 130a includes the main storage device 12a and/or the secondary storage device 13a.

The input device 14a includes a mouse and a keyboard, and is used by the user to input various kinds of information needed for processes by the distribution server 100. The user interface 15a displays various kinds of information that are needed according to control by the CPU 11a. The communication I/F 17a performs communication through a wired or wireless network. The communications by the communication I/F 17a are not limited to wired or wireless communication.

The programs that describe processes performed by the distribution server 100 are provided to the distribution server 100 by a recording medium 19a such as a CD-ROM (Compact Disc Read-Only Memory).

The drive device 18a acts as an interface between the recording medium 19a (for example, a CD-ROM) set in the drive device 18a and the distribution server 100.

Furthermore, the recording medium 19a stores programs for realizing various processes relevant to the present embodiment described below, and the programs stored in the recording medium 19a are installed in the distribution server 100 via the drive device 18a. The installed programs become executable by the distribution server 100.

Note that the medium for storing programs is not limited to a CD-ROM, as long as the medium is readable by a computer. Examples of a computer-readable recording medium are a portable recording medium such as a DVD disk and a USB memory, and a semiconductor memory such as a flash memory, other than a CD-ROM.

Figure 3:
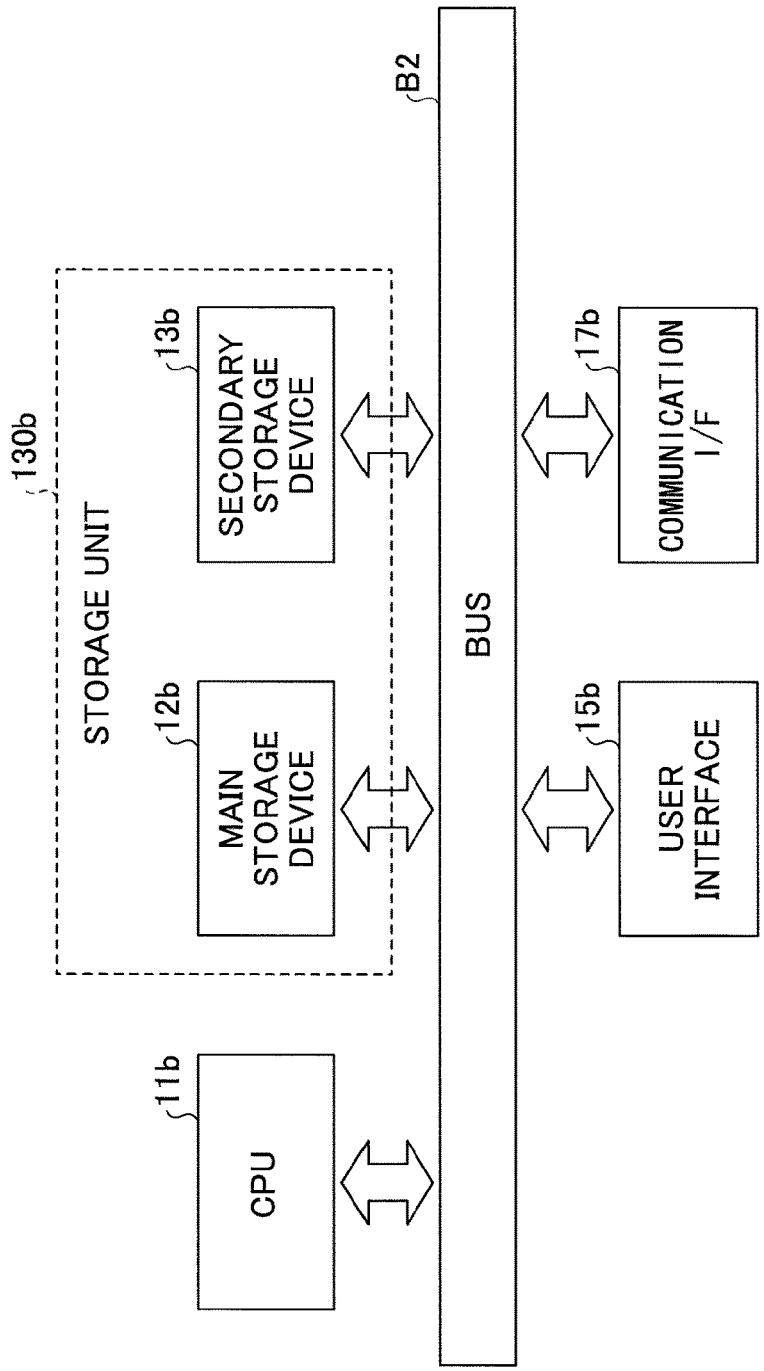
FIG. 3 illustrates an example of a hardware configuration of a terminal device.

The terminal device 5 according to the present embodiment has a hardware configuration as illustrated in FIG. 3. FIG. 3 illustrates an example of a hardware configuration of the terminal device 5. In FIG. 3, the terminal device 5 is a terminal controlled by a computer, including a CPU (Central Processing Unit) 11b, a main storage device 12b, a secondary storage device 13b, a user interface 15b, and a communication I/F (interface) 17b, which are connected to a bus B2.

The CPU 11b controls the terminal device 5 according to programs stored in the main storage device 12b. As the main storage device 12b, a RAM (Random Access Memory), and a ROM (Read Only Memory), etc., may be used, and the main storage device 12b stores or temporarily stores programs executed by the CPU 11b, data needed for processes by the CPU 11b, and data obtained by processes by the CPU 11b.

As the secondary storage device 13b, a HDD (Hard Disk Drive), etc., may be used, and the secondary storage device 13b stores data such as programs for executing various processes. As some of the programs stored in the secondary storage device 13b are loaded in the main storage device 12b and are executed by the CPU 11b, various processes are described. A storage unit 130b includes the main storage device 12b and/or the secondary storage device 13b.

The user interface 15b displays various kinds of information according to control by the CPU 11b, which may include a touch panel by which the user may input operations. The communication I/F 17b performs wireless communications, etc., through the Internet 2.

The programs such as applications according to the present embodiment that describe process performed by the terminal device 5 are downloaded from outside the distribution server 100 via the Internet 2.

Figure 4:
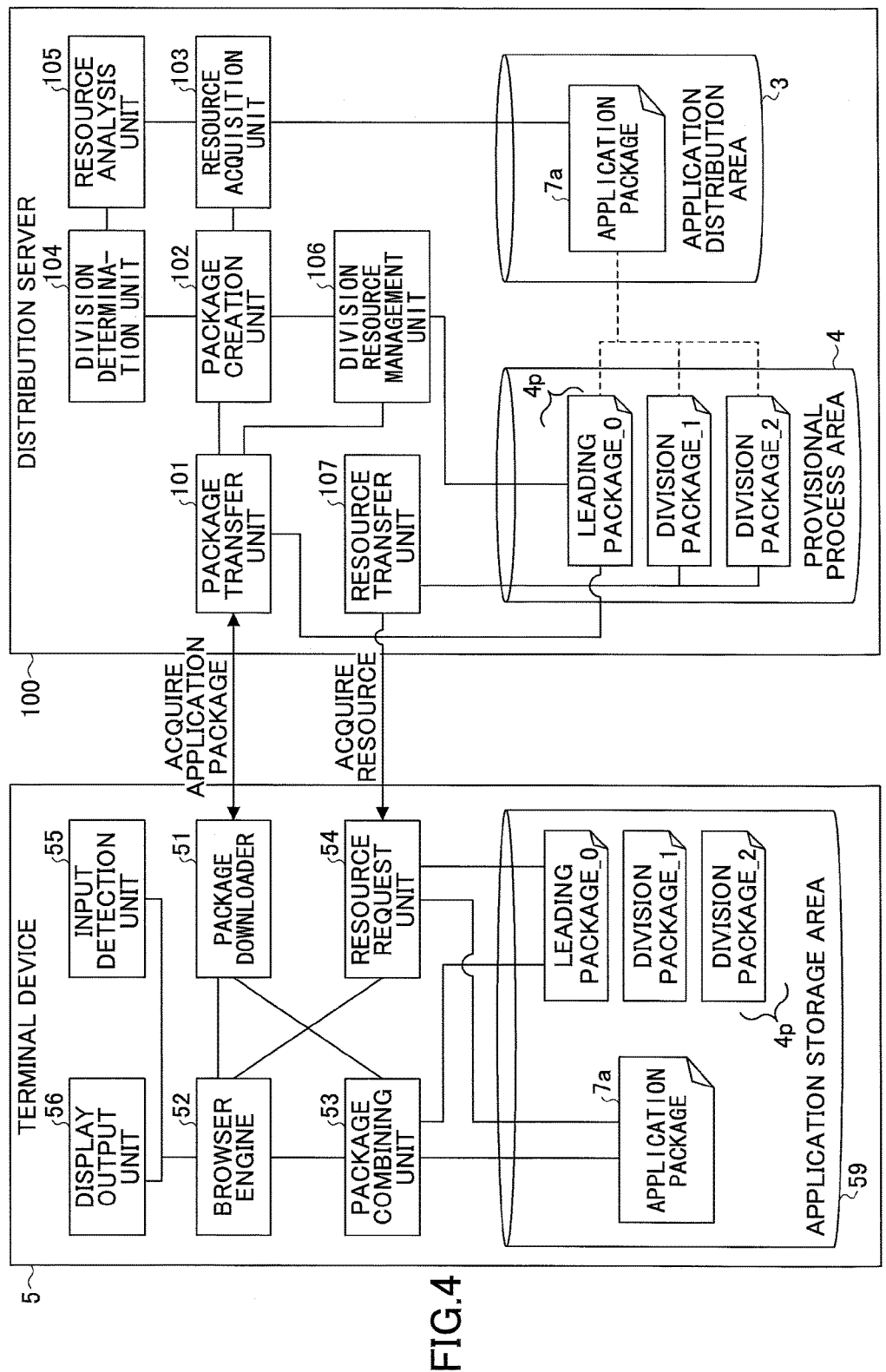
FIG. 4 illustrates an example of a functional configuration according to an embodiment.

FIG. 4 illustrates an example of a functional configuration according to the present embodiment. In FIG. 4, the distribution server 100 includes a package transfer unit 101, a package creation unit 102, a resource acquisition unit 103, a division determination unit 104, a resource analysis unit 105, a division resource management unit 106, and a resource transfer unit 107.

Furthermore, the distribution server 100 includes an application distribution area 3 storing the application package 7a, and a provisional process area 4 storing a plurality of division packages. The application distribution area 3 and the provisional process area 4 are constituted in the storage unit 130a.

The package transfer unit 101 transfers, to the terminal device 5, the division package 4p obtained by dividing the application package 7a, in response to a request to acquire an application package from the terminal device 5.

The package creation unit 102 creates the division package 4p obtained by dividing the application package 7a based on the resource size of the requested application package 7a, in response to a request to create a package from the package transfer unit 101. The division package 4p is stored in the provisional process area 4.

The resource acquisition unit 103 acquires, from the application distribution area 3, a resource set of the application package 7a specified by a resource acquisition request, in response to the resource acquisition request from the package creation unit 102, and reports resource information to the package creation unit 102.

The division determination unit 104 causes the resource analysis unit 105 to determine a division unit, generates division packages based on the division unit, and causes the division resource management unit 106 to arrange the resource of the division package in the provisional process area 4.

The resource analysis unit 105 makes an analysis based on the resource size and link information, in response to a resource analysis request from the division determination unit 104, and determines the division unit. The analysis method for determining the division unit is not limited to a method based on the resource size and link information.

The division resource management unit 106 deletes, from the provisional process area 4, a division package 4p for which transfer to the terminal device 5 has been completed.

The resource transfer unit 107 transfers, from the provisional process area 4, the division package 4p specified by a resource acquisition request, in response to the resource acquisition request from the terminal device 5.

In FIG. 4, the terminal device 5 includes a package downloader 51, a browser engine 52, a package combining unit 53, a resource request unit 54, an input detection unit 55, and a display output unit 56.

The package downloader 51 makes an application package acquisition request to the distribution server 100, and downloads the leading package_0. The downloaded leading package_0 is stored in an application storage area 59. The package downloader 51 sequentially downloads a division package_1, a division package_2, etc., after the leading package_0.

The browser engine 52 executes an application which has been obtained by decompressing the application package 7a, in response to an application execution request from the package downloader 51.

The package combining unit 53 sequentially combines the division package_0, the division package_1, etc., stored in the application storage area 59, with the leading package_0, in response to a request to combine the division packages from the package downloader 51.

The resource request unit 54 acquires a target resource from the application storage area 59 or the distribution server 100, in response to a target resource acquisition request requesting a resource of a page linked from the top page. When the target resource is not present in the application storage area 59, the resource request unit 54 makes a resource acquisition request to the distribution server 100, and acquires the target resource from the distribution server 100.

The input detection unit 55 detects an input operation on the terminal device 5 by the user and reports the detection result to the browser engine 52. The display output unit 56 displays a screen in response to a screen display request from the browser engine 52.

Figure 5:
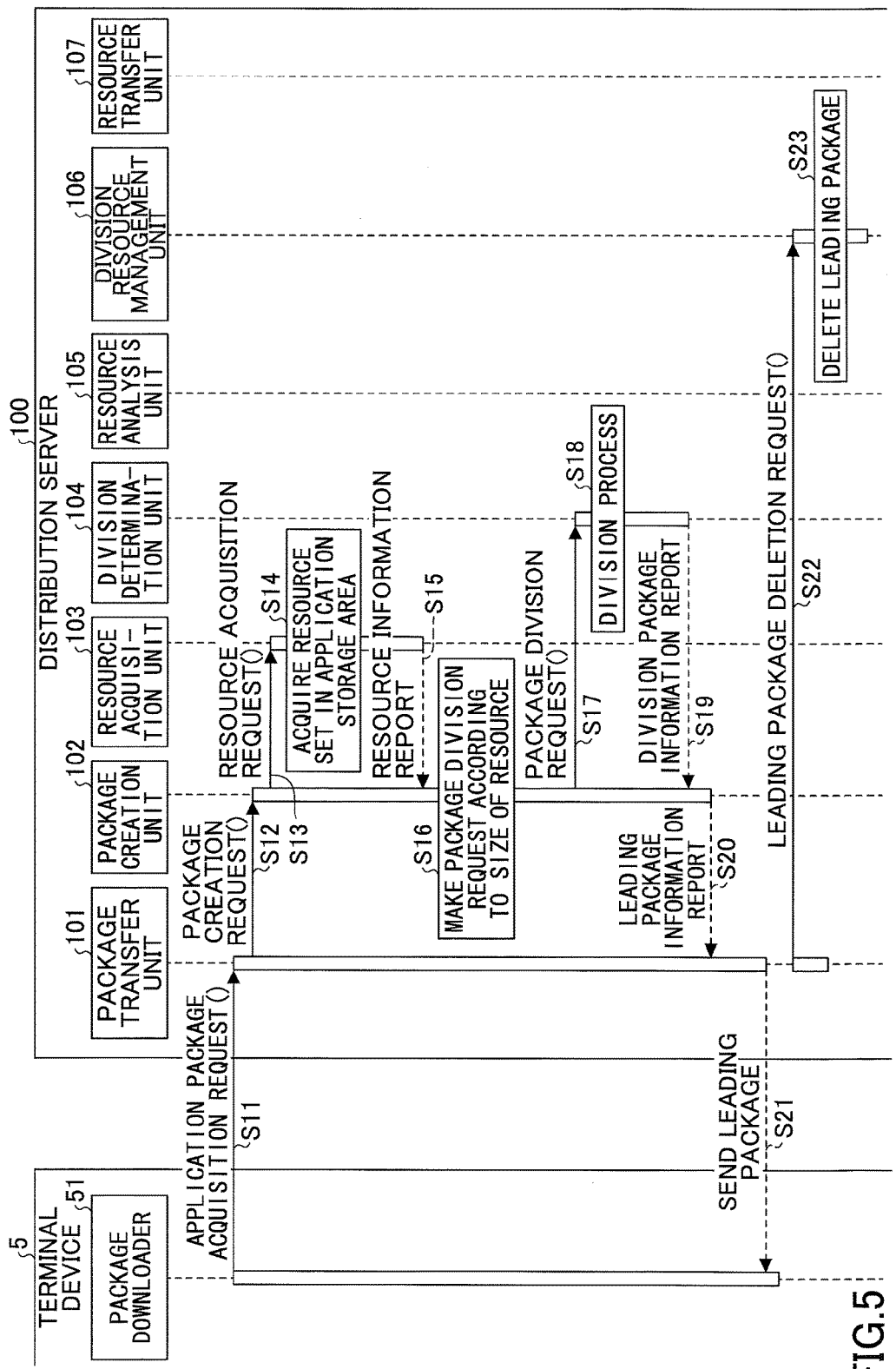
FIG. 5 illustrates a process sequence relevant to acquiring an application package in the distribution server.

In the following, a description is given of a process sequence between the terminal device 5 and the distribution server 100, with reference to FIGS. 5 through 9. FIG. 5 illustrates a process sequence relevant to acquiring an application package in the distribution server 100.

In FIG. 5, the package downloader 51 of the terminal device 5 makes an application package acquisition request to the distribution server 100 (step S11). When the application package acquisition request is received, the package transfer unit 101 makes a request to create a package of the application specified in the application package acquisition request, to the package creation unit 102 (step S12).

The package creation unit 102 makes a resource acquisition request to the resource acquisition unit 103, in order to acquire the application package specified in a package creation request, in response to the package creation request from the package transfer unit 101 (step S13).

The resource acquisition unit 103 acquires a resource set relevant to the application specified in a resource acquisition request in the application storage area 59, in response to the resource acquisition request from the package creation unit 102 (step S14). Then, the resource acquisition unit 103 reports the acquired resource information to the package creation unit 102 (step S15).

The package creation unit 102 makes a package division request to the division determination unit 104, according to the size of the resource (step S16). The package creation unit 102 does not perform the division if the size of the resource is less than or equal to a threshold at which the resource may be transferred by a single package. When the size of the resource is greater than the threshold at which the resource may be transferred by a single package, the package creation unit 102 makes a package division request to the resource acquisition unit 103 (step S17).

The resource acquisition unit 103 performs a division process (FIG. 6) in response to the package division request from the package creation unit 102 (step S18), and reports the division package information relevant to the division result, to the package creation unit 102 (step S19).

The package creation unit 102 reports leading package information to the package transfer unit 101, based on the division package information reported from the division determination unit 104 (step S20). The leading package information includes the information of the storage location of the leading package_0 in the application storage area 59.

The package transfer unit 101 refers to the leading package information reported from the package creation unit 102, and sends the leading package_0 in the application storage area 59 to the terminal device 5 (step S21). The terminal device 5 downloads the leading package_0. The leading package_0 is stored in the application storage area 59 of the terminal device 5.

When the sending of the leading package_0 is completed, the package transfer unit 101 makes a request to delete the leading package_0, to the division resource management unit 106 (step S22). The division resource management unit 106 deletes the leading package_0 from the application storage area 59, in response to the request to delete the leading package_0 from the package transfer unit 101 (step S23).

Figure 6:
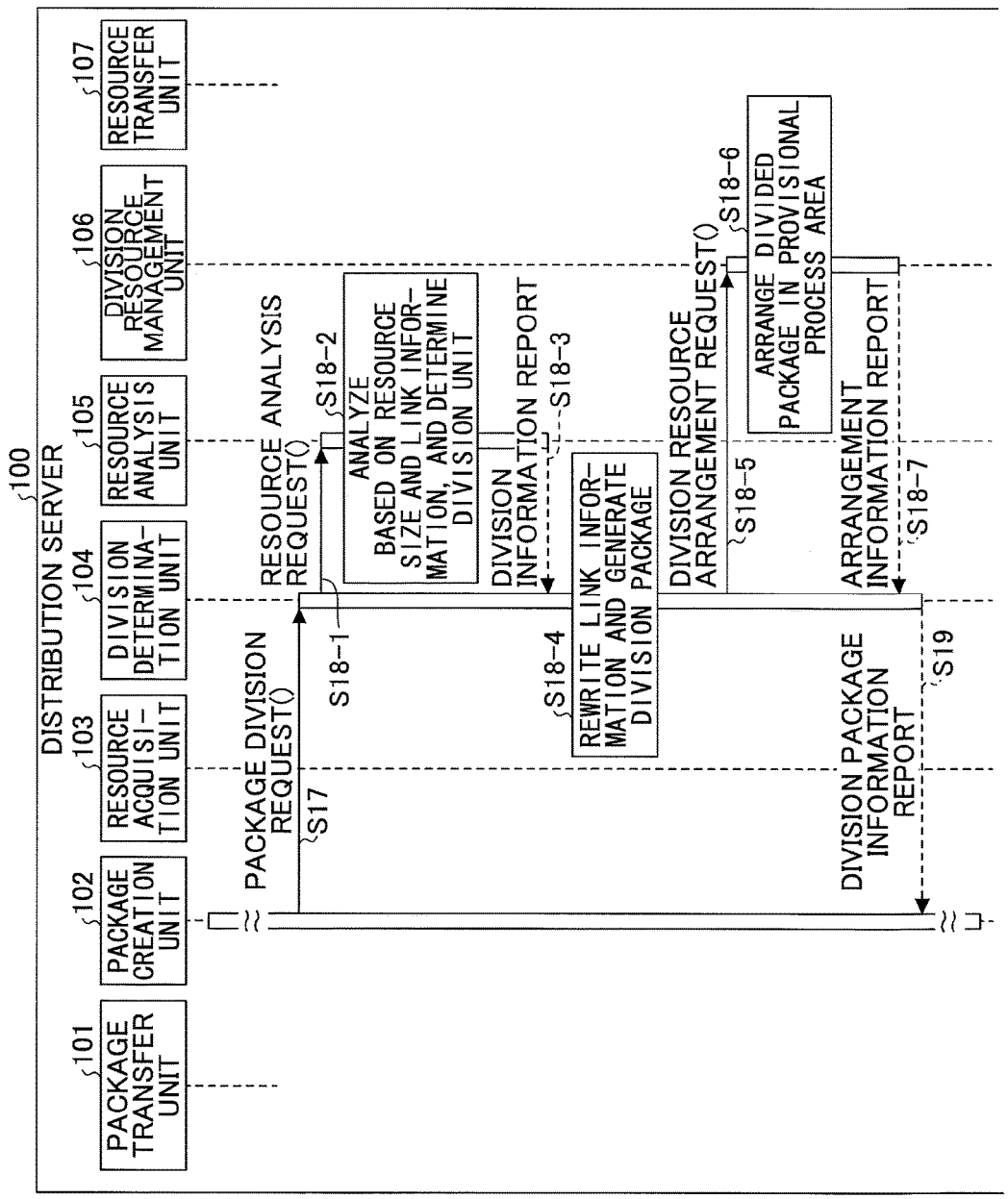
FIG. 6 illustrates a process sequence relevant to a division process in the distribution server.

FIG. 6 illustrates a process sequence relevant to a division process in the distribution server 100. In FIG. 6, when the package division request is received from the package creation unit 102 (step S17), the division determination unit 104 makes a resource analysis request to the resource analysis unit 105 (step S18-1).

The resource analysis unit 105 performs resource makes an analysis in response to the resource analysis request from the division determination unit 104. Specifically, the resource analysis unit 105 analyzes the division method based on the resource size and the link information, and determines the division unit (step S18-2). Then, the resource analysis unit 105 reports the division information indicating the division method to the division determination unit 104 (step S18-3).

The division determination unit 104 rewrites the link information of the leading package_0 including the top page according to the division method, and generates a division package (step S18-4). The division determination unit 104 makes a division resource arrangement request to the division resource management unit 106 (step S18-5). An example of rewriting the link information is described below with reference to FIG. 18.

The division resource management unit 106 arranges, in the provisional process area 4, a plurality of division packages that have been obtained by dividing the application into packages, in response to the division resource arrangement request from the division determination unit 104 (step S18-6), and reports arrangement information to the division determination unit 104 (step S18-7).

The division determination unit 104 reports the division package information to the package creation unit 102, when the report of the arrangement information is received from the division resource management unit 106 (step S19).

Figure 7:
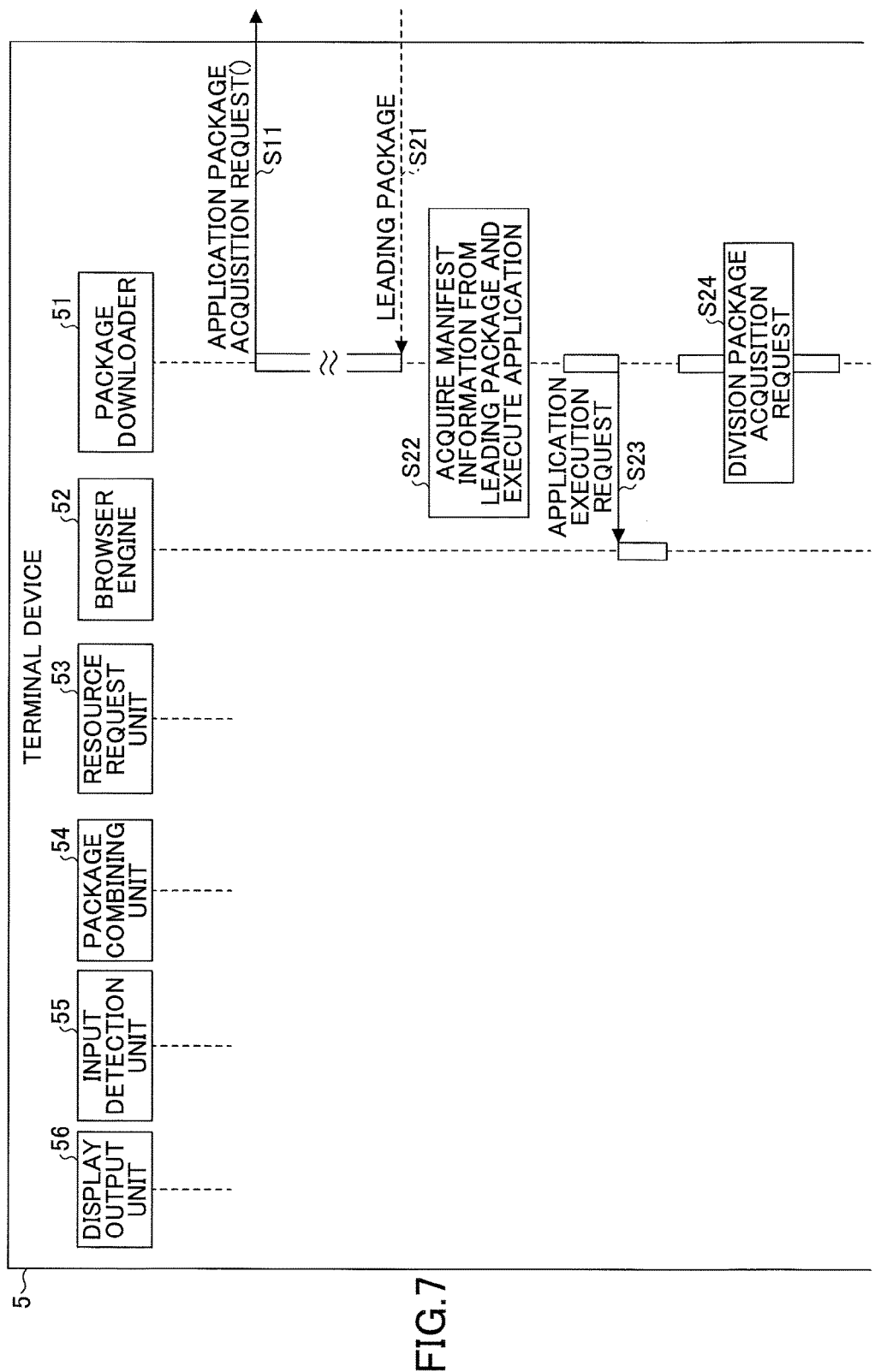
FIG. 7 illustrates a process sequence relevant to acquiring an application package in the terminal device.

FIG. 7 illustrates a process sequence relevant to acquiring an application package in the terminal device 5. In FIG. 7, the package downloader 51 of the terminal device 5 makes an application package acquisition request to the distribution server 100 (step S11), and receives the leading package_0 from the distribution server 100 (step S21). The leading package_0 is stored in the application storage area 59.

When the leading package_0 is received, the package downloader 51 acquires manifest information from the leading package_0, and identifies the top page (step S22).

The package downloader 51 is able to recognize the file configuration from the manifest information. The manifest information is described below. The top page is identified from the manifest information, and the package downloader 51 makes an application execution request to the browser engine (step S23). The browser engine 52 displays the top page on the display screen 5a.

The package downloader 51 performs a division package acquisition process (step S24). The package downloader 51 acquires the division number from the manifest information, and acquires, from the distribution server 100, the division package_1, and division package_2, other than the leading package_0.

Figure 8:
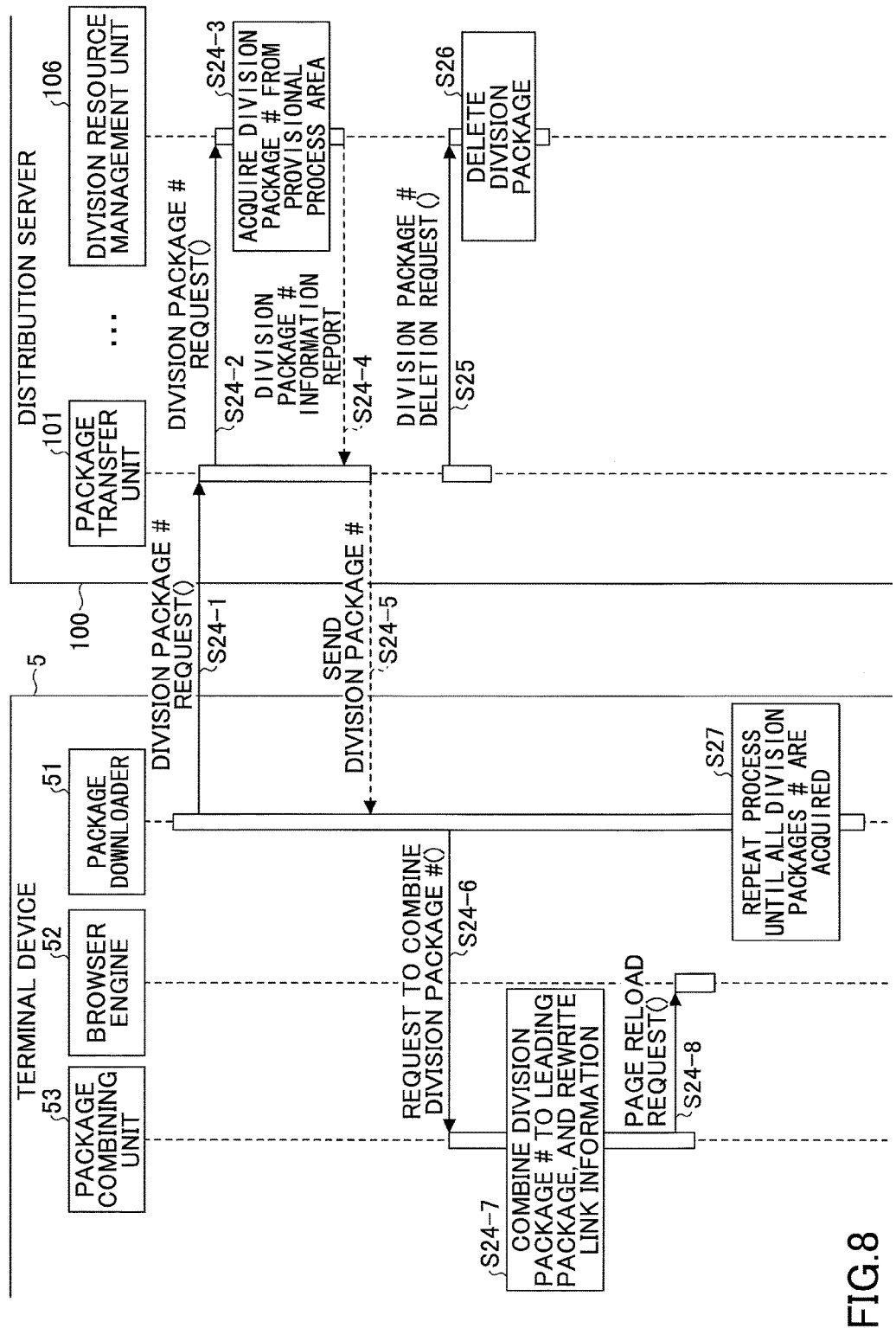
FIG. 8 illustrates a process sequence relevant to a division package acquisition process in the terminal device.

FIG. 8 illustrates a process sequence relevant to a division package acquisition process in the terminal device 5. In FIG. 8, the package downloader 51 of the terminal device 5 requests a division package # (number) from the distribution server 100 (step S24-1). The division package # is a number, etc., for identifying a division package.

When the division package # request is received at the distribution server 100, the package transfer unit 101 makes a division package # acquisition request to the division resource management unit 106 (step S24-2).

The division resource management unit 106 acquires the division package # from the provisional process area 4, in response to the division package # acquisition request (step S24-3), and reports the division package # information to the package transfer unit 101 (step S24-4). The division package # information includes an address of the division package # in the provisional process area 4.

The package transfer unit 101 acquires the division package # in the provisional process area 4 based on the division package # information, and sends the division package # to the terminal device 5 (step S24-5). The terminal device 5 downloads the division package #. The division package # is stored in the application storage area 59 of the terminal device 5.

Meanwhile, in the distribution server 100, when the package transfer unit 101 completes the transfer of the division package #, the package transfer unit 101 makes a request to delete the division package # to the division resource management unit 106 (step S25). The division resource management unit 106 deletes the division package # from the provisional process area 4, in response to the request to delete the division package # from the package transfer unit 101 (step S26).

When the package downloader 51 downloads the division package #, the package downloader 51 makes a request to combine the division package #, to the package combining unit 53 (step S24-6).

The package combining unit 53 combines the division package # to the leading package in response to the request to combine the division package # from the package downloader 51, and rewrites the link information in the application storage area 59 of the terminal device 5 (step S24-7).

Then, the package combining unit 53 makes a request to reload the page, to the browser engine 52 (step S24-8). The browser engine 52 reloads the page in response to the request to reload the page. The display of the display page 5a of the terminal device 5 does not change, but the hyperlink destination from the displayed page is changed from the distribution server 100 to the application storage area 59 of the terminal device 5.

The package downloader 51 repeats the process of steps S24-1 through S24-8 described above, for the remaining division packages # (step S27). Then, all of the division packages # are acquired and stored in the application storage area 59.

Every time a division package # is received, the division package # is combined with the leading package_0, and therefore the application package 7a is restored in the application storage area 59. In the process of restoring the application package 7a, the link information is not changed for pages included in division packages # that are not yet received. When the user selects a page included in a division package # that is not yet received, the hyperlink destination is specifying the distribution server 100, and therefore the selected page is acquired from the distribution server 100. Therefore, the user does not need to wait until the application package 7a is completely restored, in order to execute the application.

Figure 9:
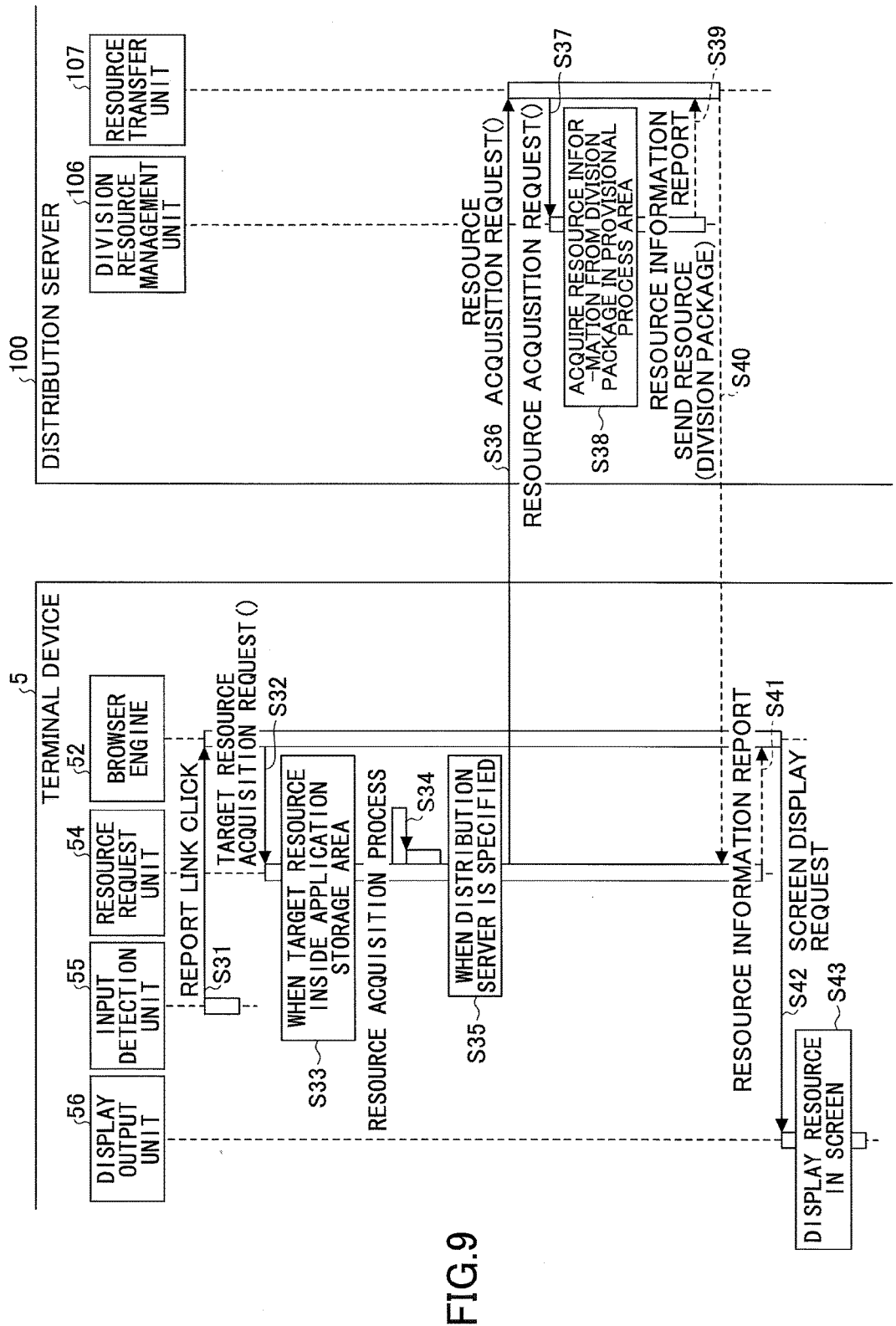
FIG. 9 illustrates a process sequence relevant to a link process.

A description is given of a link process in a case where the user selects another page from the page displayed in the display screen 5a of the terminal device 5. FIG. 9 illustrates a process sequence relevant to a link process.

In FIG. 9, when the input detection unit 55 of the terminal device 5 detects a link click by the user (step S31), the browser engine 52 makes a target resource acquisition request to the resource request unit 54 (step S32). In the target resource acquisition request, the page, image, etc., selected by the user is specified as the target resource.

When the application storage area 59 is specified in the target resource acquisition request (step S33), the resource request unit 54 performs a resource acquisition process of acquiring, from the application storage area 59, the target resource specified in the target resource acquisition request (step S34).

Meanwhile, when the distribution server 100 is specified in the target resource acquisition request (step S35), the resource request unit 54 makes a resource acquisition request to the distribution server 100 (step S36). The resource request unit 54 makes the resource acquisition request to the distribution server 100, without waiting for the remaining division packages 4p.

In the distribution server 100, when the resource acquisition request is received from the terminal device 5, the resource transfer unit 107 makes a resource acquisition request to the division resource management unit 106 (step S37).

The division resource management unit 106 acquires, from the division package 4p in the provisional process area 4, resource information such as the address of the resource specified in the resource acquisition request, in response to the resource acquisition request from the resource transfer unit 107 (step S38), and reports the resource information to the resource transfer unit 107 (step S39).

The resource transfer unit 107 sends the resource to the terminal device 5 in response to the report of the resource information from the division resource management unit 106 (step S40).

In the terminal device 5, when the resource is received, the resource request unit 54 reports the resource information to the browser engine 52 (step S41). The browser engine 52 makes a screen display request to the display output unit 56, in response to the report of the resource information from the resource request unit 54 (step S42). The display output unit 56 displays the resource on the screen in response to the screen display request from the browser engine 52 (step S43).

Next, a description is given of the process flow performed by the respective processing units of the distribution server 100 and the terminal device 5, with reference to FIGS. 10 through 15. First, a description is given of a process at the terminal device 5. A description is given of an application download process of downloading an application to displaying a top page in the terminal device 5.

Figure 10:
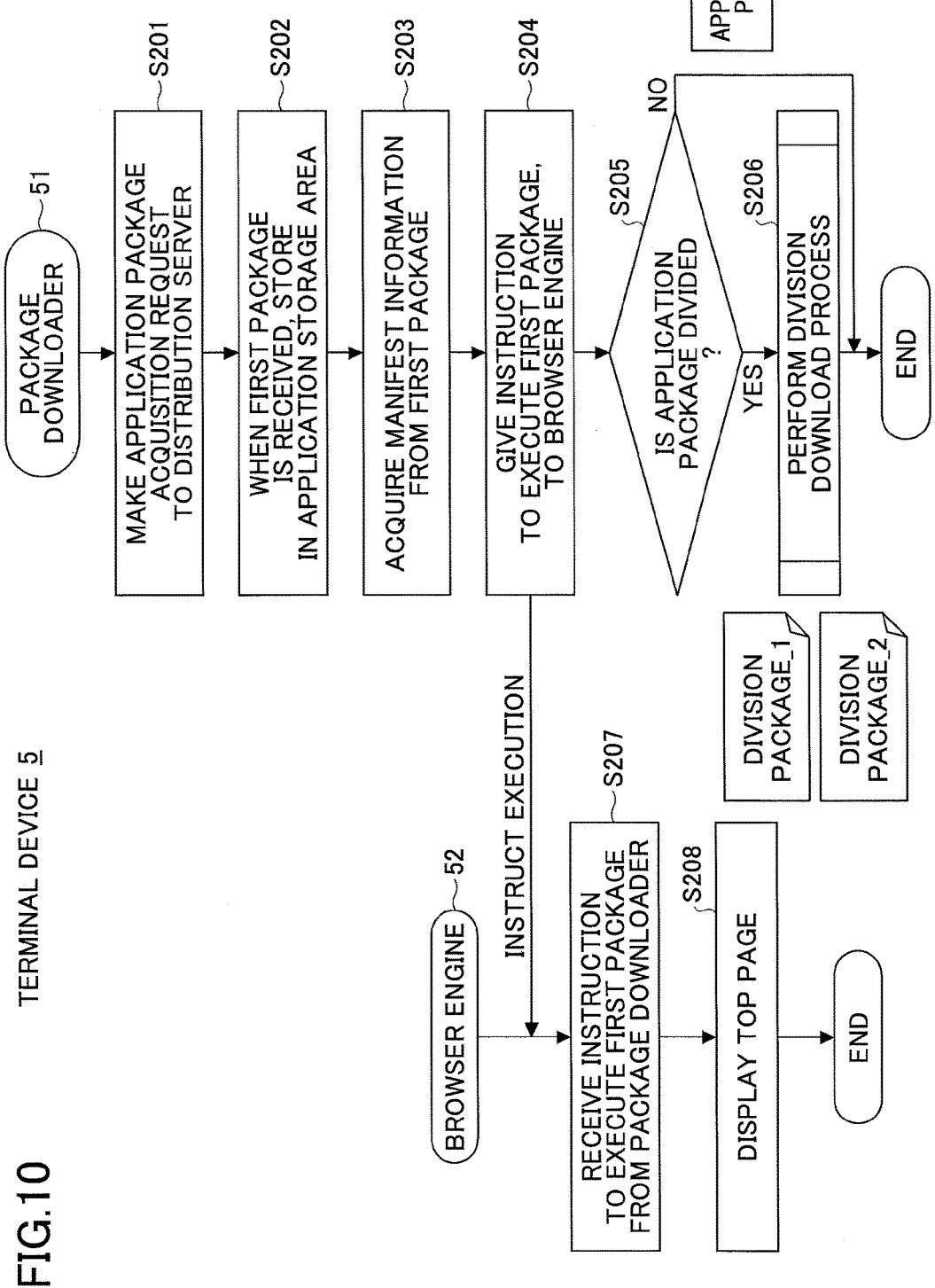
FIG. 10 is a flowchart of an application download process.

FIG. 10 is a flowchart of an application download process. In FIG. 10, the package downloader 51 makes a request to acquire the application package 7a to the distribution server 100 (step S201).

When the first package is received from the distribution server 100, the package downloader 51 stores the package in the application storage area 59 (step S202), and acquires manifest information from the first package (step S203). The first package is the application package 7a or the leading package_0.

The package downloader 51 gives an instruction to execute the first package, to the browser engine 52 (step S204).

Then, the package downloader 51 refers to the manifest information, and determines whether the application package 7a is divided (step S205). When the application package 7a is not divided, the package downloader 51 determines that the first package is the application package 7a, and the application download process ends.

When the application package 7a is divided, the package downloader 51 performs a division download process (step S206). The first package is determined to be the leading package_0. The remaining division package_0 and division package_1 are downloaded. After the division download process ends, the application download process ends.

Meanwhile, when an instruction to execute the first package (application package 7a or leading package_0) is received from the package downloader 51 (step S207), the browser engine 52 displays a top page on the display screen 5a via the display output unit 56 (step S208).

Figure 11:
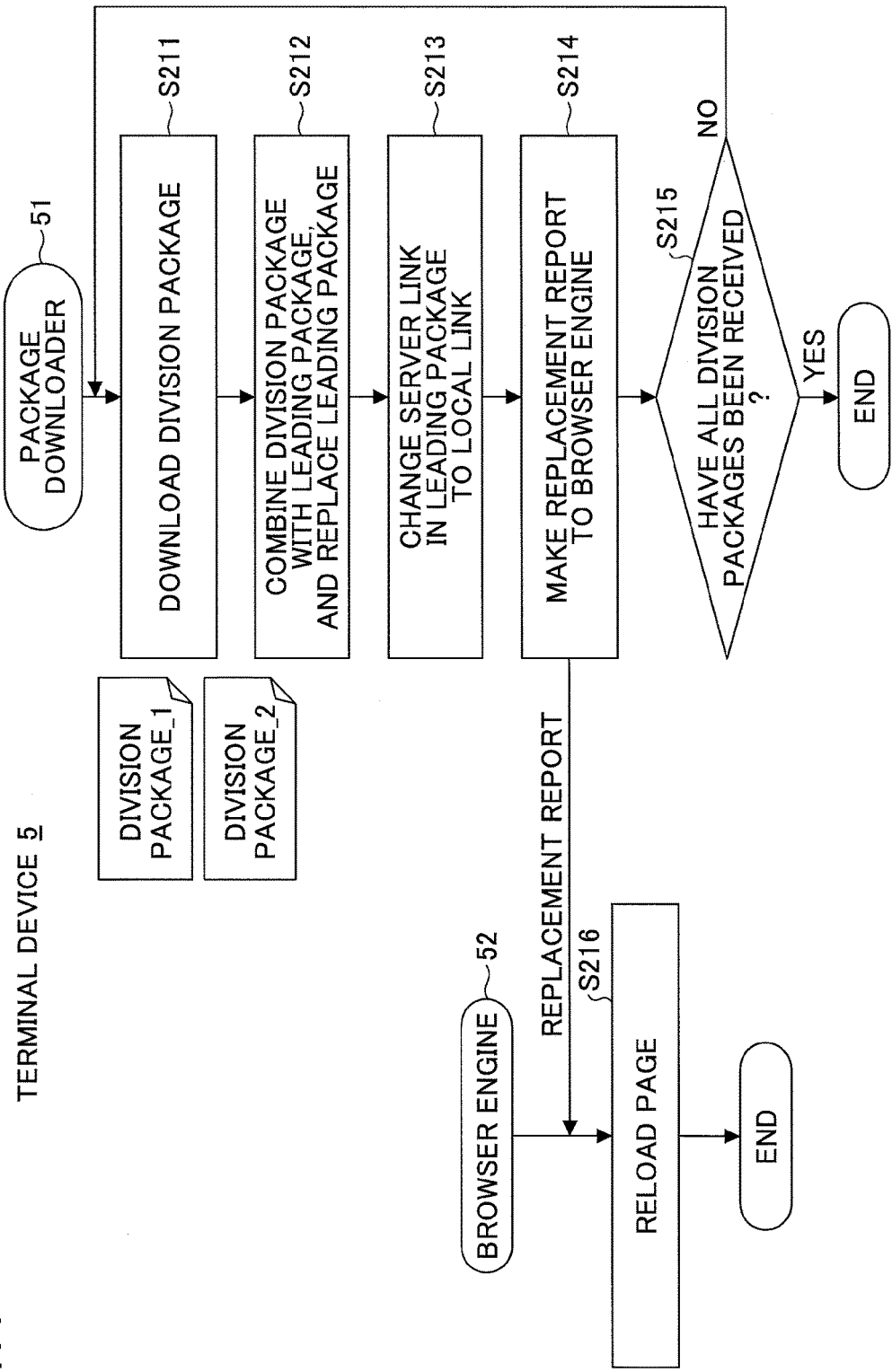
FIG. 11 is a flowchart of a division download process at step S206 in FIG. 10.

FIG. 11 is a flowchart of a division download process at step S206 in FIG. 10. In FIG. 11, the package downloader 51 downloads the division package_1 (step S211).

The package downloader 51 combines the division package_1 with the leading package_0, and replaces the leading package_0 (step S212). The package downloader 51 changes the sever link to a local link, in the link information in the leading package_1 (step S213).

The package downloader 51 makes a replacement report to the browser engine 52 (step S214). Then, the package downloader 51 determines whether all of the division packages 4p have been received (step S215). When all of the division packages 4p have not been received, the package downloader 51 returns to step S211 and repeats the same process as above until all of the division packages 4p are received. When all of the division packages 4p have been received, the package downloader 51 ends the division download process.

Meanwhile, the browser engine 52, which has received the replacement report, reloads the page (step S216). By reloading the page, the information displayed in the display screen 5a does not change, but the hyperlink destination may change from the server link to a local link. The reloading of the page is performed every time the division package 4p is combined, and after restoring the application package 7a, all sever links are changed to local links.

Figure 12:
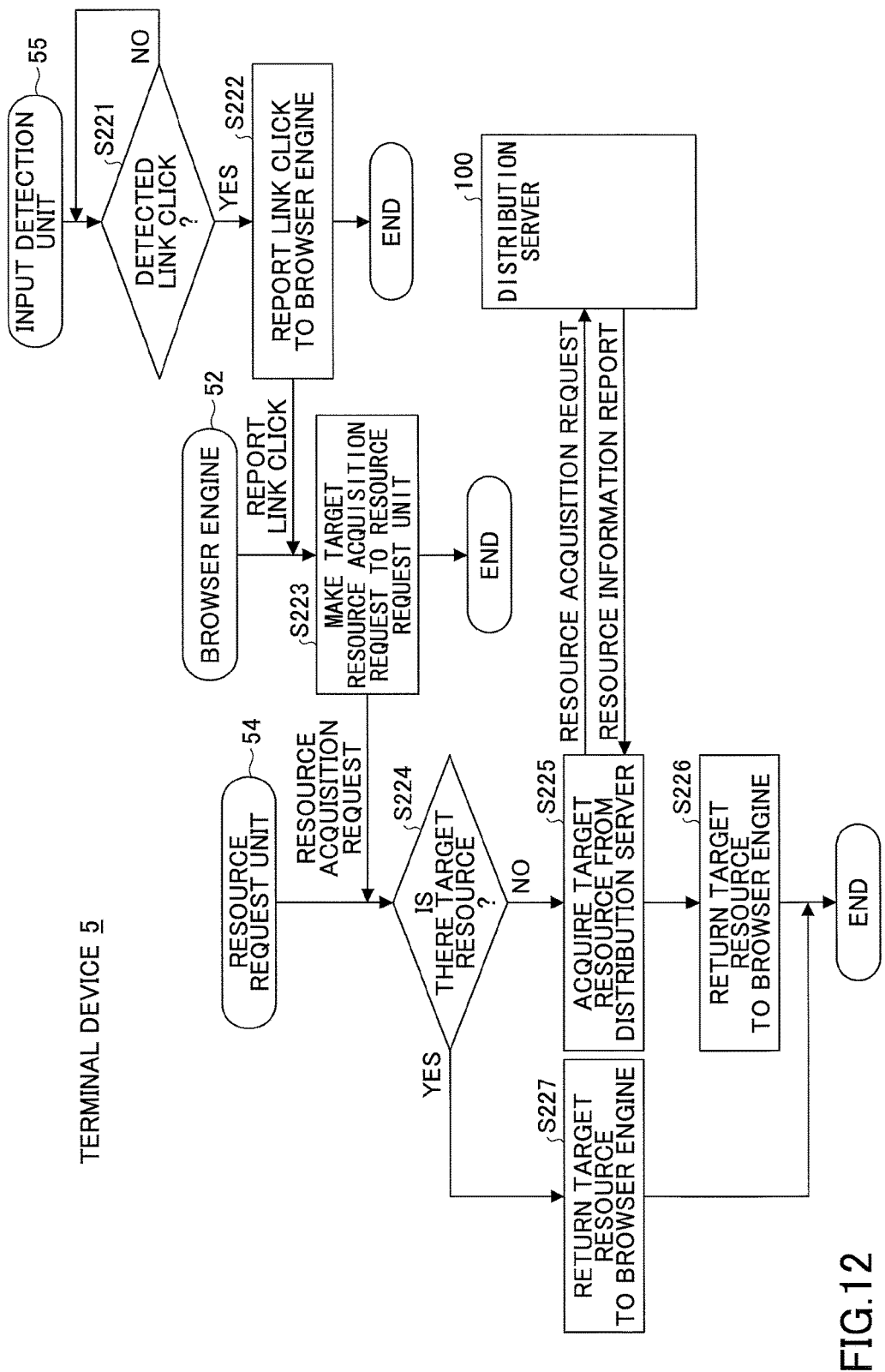
FIG. 12 is a flowchart of a link process on the terminal device side.

Next, a description is given of a link process performed on the terminal device 5 side, for displaying the page of the hyperlink destination from the page presently being displayed on the display screen 5a. FIG. 12 is a flowchart of a link process on the terminal device 5 side.

In FIG. 12, the input detection unit 55 determines whether a link click by the user is detected (step S221). When a link click is not detected, the input detection unit 55 repeats step S221 at predetermined intervals. When a link click is detected, the input detection unit 55 reports the link click to the browser engine 52 (step S222).

When the link click report is received from the input detection unit 55, the browser engine 52 makes a target resource acquisition request to the resource request unit 54, to acquire a target resource specified by the link click report (step S223).

When the target resource acquisition request is received from the browser engine 52, the resource request unit 54 determines whether the target resource is present in the application storage area 59 (step S224). When the target resource is not present in the application storage area 59, the resource request unit 54 makes a request for the target resource to the distribution server 100, and acquires the target resource from the distribution server 100 (step S225).

When the resource request unit 54 returns the target resource acquired from the distribution server 100 to the browser engine 52 (step S226), the link process ends.

Meanwhile, when the target resource is present in the application storage area 59 in step S224, the resource request unit 54 acquires the target resource from the application storage area 59, and returns the target resource to the browser engine (step S227). Then, the link process ends.

Figure 13:
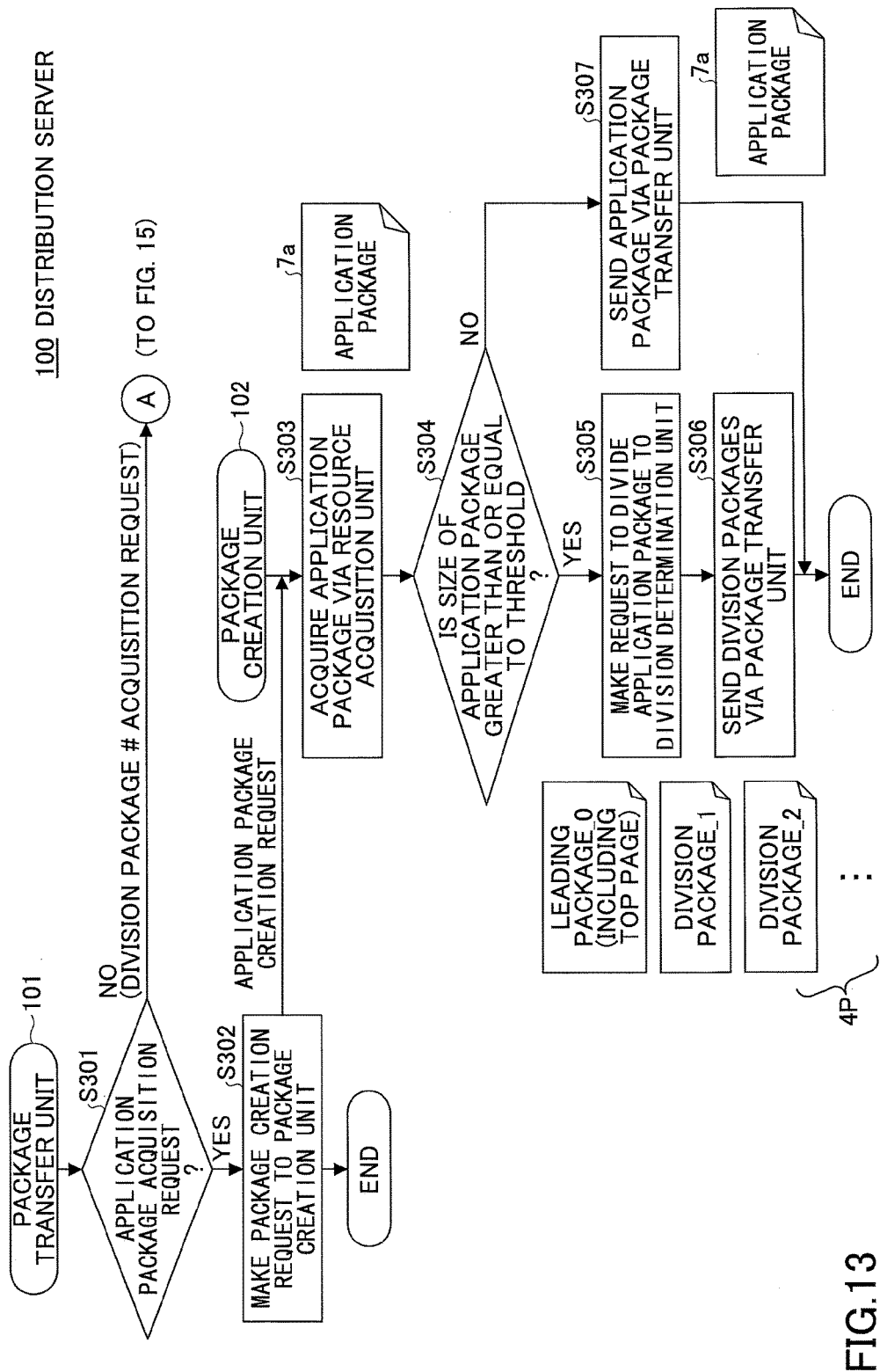
FIG. 13 is a flowchart of an application package acquisition process at the distribution server.

Next, a description is given of a process on the distribution server 100 side. FIG. 13 is a flowchart of an application package acquisition process at the distribution server 100.

In FIG. 13, the package transfer unit 101 of the distribution server 100 determines whether the application package acquisition request is received (step S301). When a resource acquisition request is not received, the package transfer unit 101 proceeds to FIG. 15. When an application package acquisition request is received, the package transfer unit 101 makes a package creation request to the package creation unit 102 (step S302).

The package creation unit 102 acquires the application package 7a via the resource acquisition unit 103 (step S303). The package creation unit 102 determines whether the size of the application package 7a is greater than or equal to the threshold of one transfer size (step S304).

When the size of the application package 7a is greater than or equal to the threshold of one transfer size, the package creation unit 102 makes a request to divide the application package 7a to the division determination unit 104 (step S305). The package creation unit 102 sends the division packages 4p obtained by dividing the application package 7a, via the package transfer unit 101 (step S306). Then, the application package acquisition process ends.

When the size of the application package 7a is less than the threshold of one transfer size, the package creation unit 102 sends the application package 7a via the package transfer unit 101 (step S307). Then, the application package acquisition ends.

Figure 14:
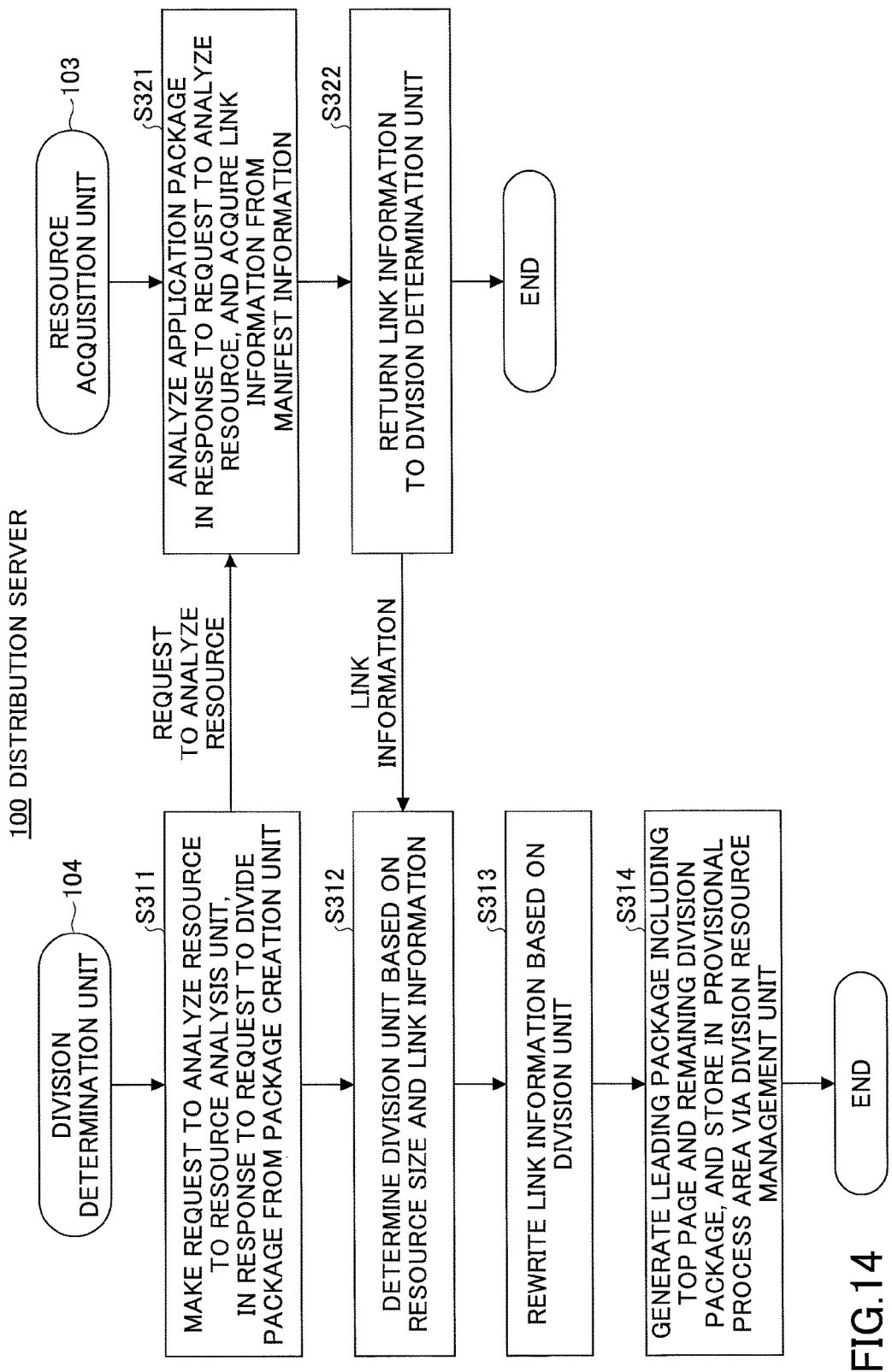
FIG. 14 is a flowchart of a division process at the distribution server.

FIG. 14 is a flowchart of a division process at the distribution server 100. In FIG. 14, the division determination unit 104 makes a request to analyze the resource to the resource analysis unit 105, in response to a request to divide the package from the package creation unit 102 (step S311).

The division determination unit 104 determines the division unit based on the resource size and the link information acquired from the resource analysis unit 105 (step S312). Then, the division determination unit 104 rewrites the link information based on the division unit (step S313).

The division determination unit 104 generates a leading package_0 including the top page and the remaining division packages 4p including the division package_1, etc., and stores these packages in the provisional process area 4 via the division resource management unit 106 (step S314).

Meanwhile, the resource acquisition unit 103 acquires link information from the manifest information, in response to a request to analyze the resource from the division determination unit 104 (step S321). Then, the resource acquisition unit 103 returns the link information to the division determination unit 104 (step S322).

Figure 15:
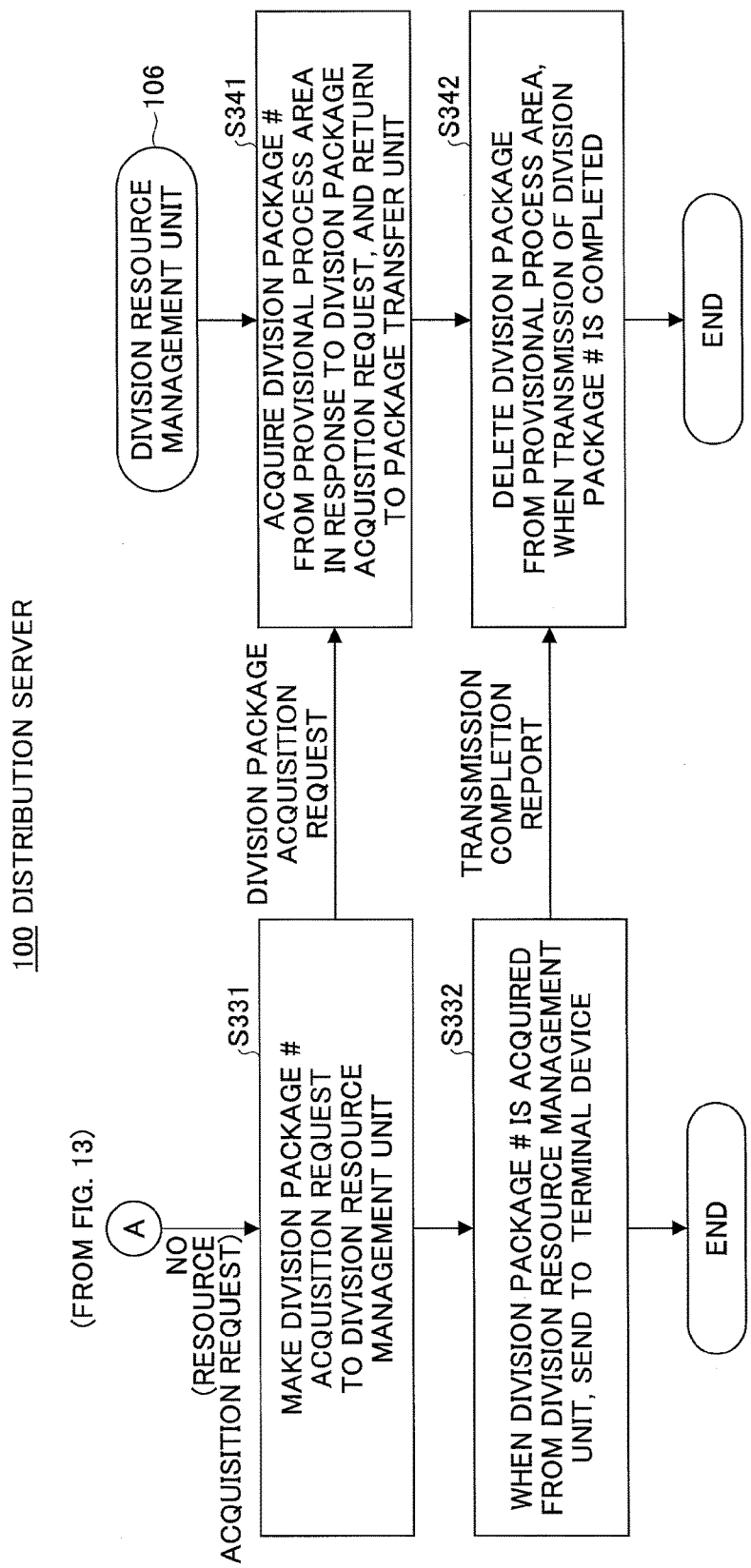
FIG. 15 is a flowchart of a division package acquisition process at the distribution server.

FIG. 15 is a flowchart of a division package acquisition process at the distribution server 100. In FIG. 15, the package transfer unit 101 makes a division package acquisition request to the division resource management unit 106 (step S341). Then, the package transfer unit 101 acquires the division package from the division resource management unit 106, and sends the division package to the terminal device 5 (step S332).

Meanwhile, when the division package acquisition request is received from the package transfer unit 101, the division resource management unit 106 acquires, from the provisional process area 4, a division package # specified in the division package acquisition request, and returns the division package # to the package transfer unit 101 (step S341).

The division resource management unit 106 deletes, from the provisional process area 4, the division package # that has been sent, every time the transmission of the division package # is completed (step S342). When the transmission of the division package_1 among the division packages 4p is completed, the division package_1 is deleted from the provisional process area 4.

Figure 16:
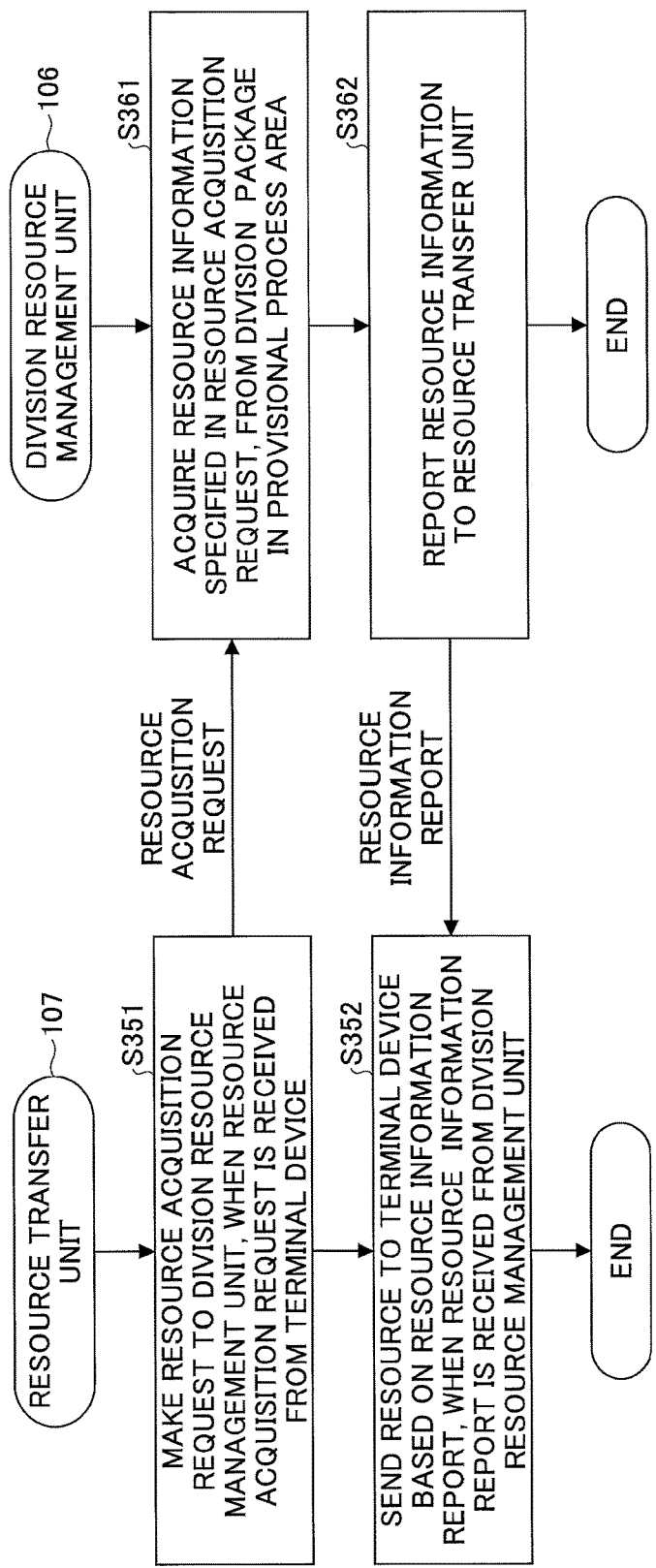
FIG. 16 is a flowchart of a link process at the distribution server.

FIG. 16 is a flowchart of a link process at the distribution server 100. In FIG. 16, when the resource transfer unit 107 receives a resource acquisition request from the terminal device 5, the resource transfer unit 107 makes a resource acquisition request to the division resource management unit 106 (step S351).

Then, when a resource information report is received from the resource transfer unit 107, the division resource management unit 106 sends the resource to the terminal device 5 based on the resource acquisition request (step S352).

Meanwhile, when a resource acquisition request is received from the resource transfer unit 107, the division resource management unit 106 acquires, from the division package 4p in the provisional process area 4, the resource information specified in the resource acquisition request (step S361).

Then, the division resource management unit 106 reports the resource information acquired from the division package 4p, to the resource transfer unit 107 (step S362).

Figure 17:
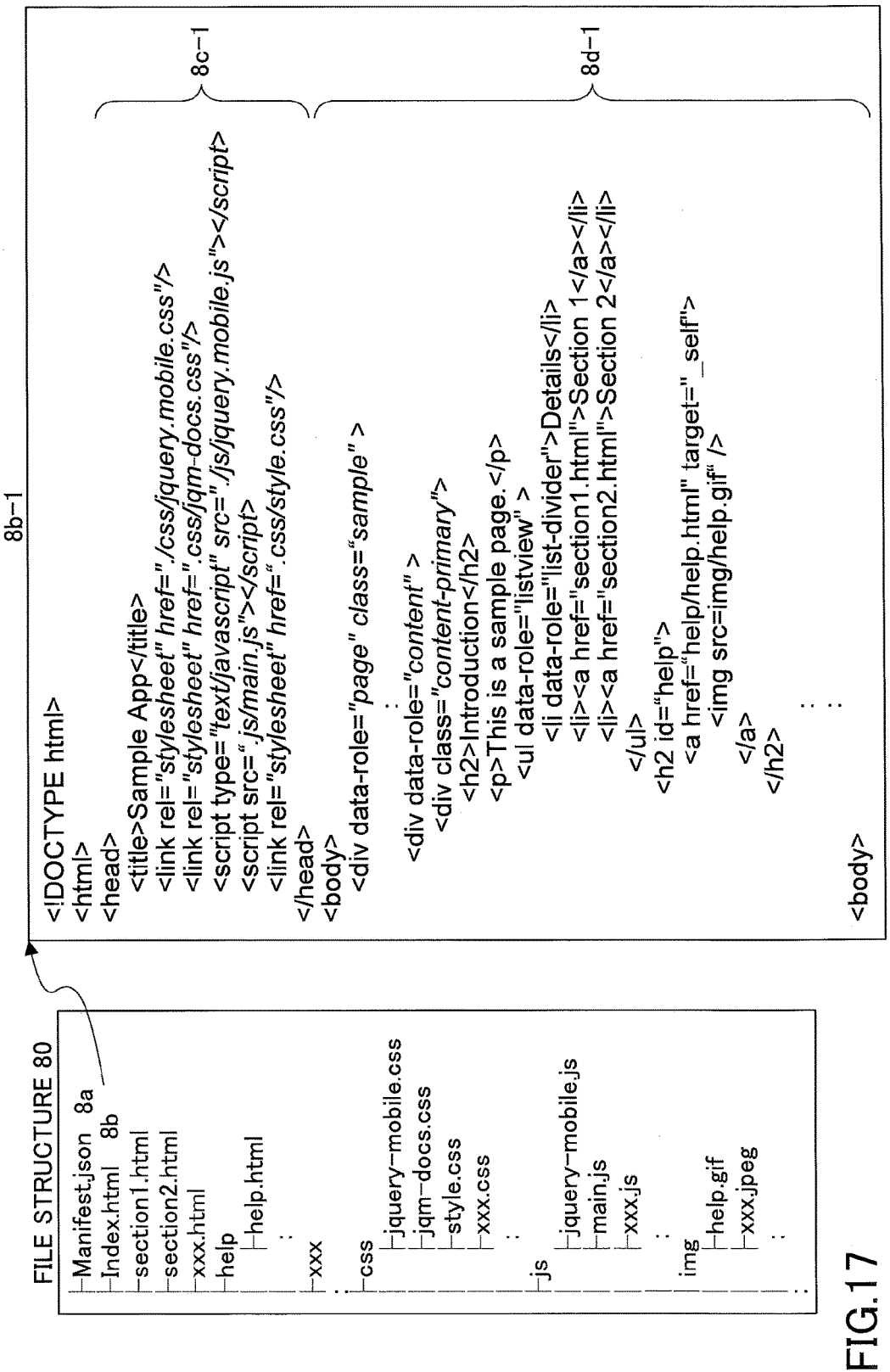
FIG. 17 illustrates an example of the file structure of an application package before being divided.
Figure 18:
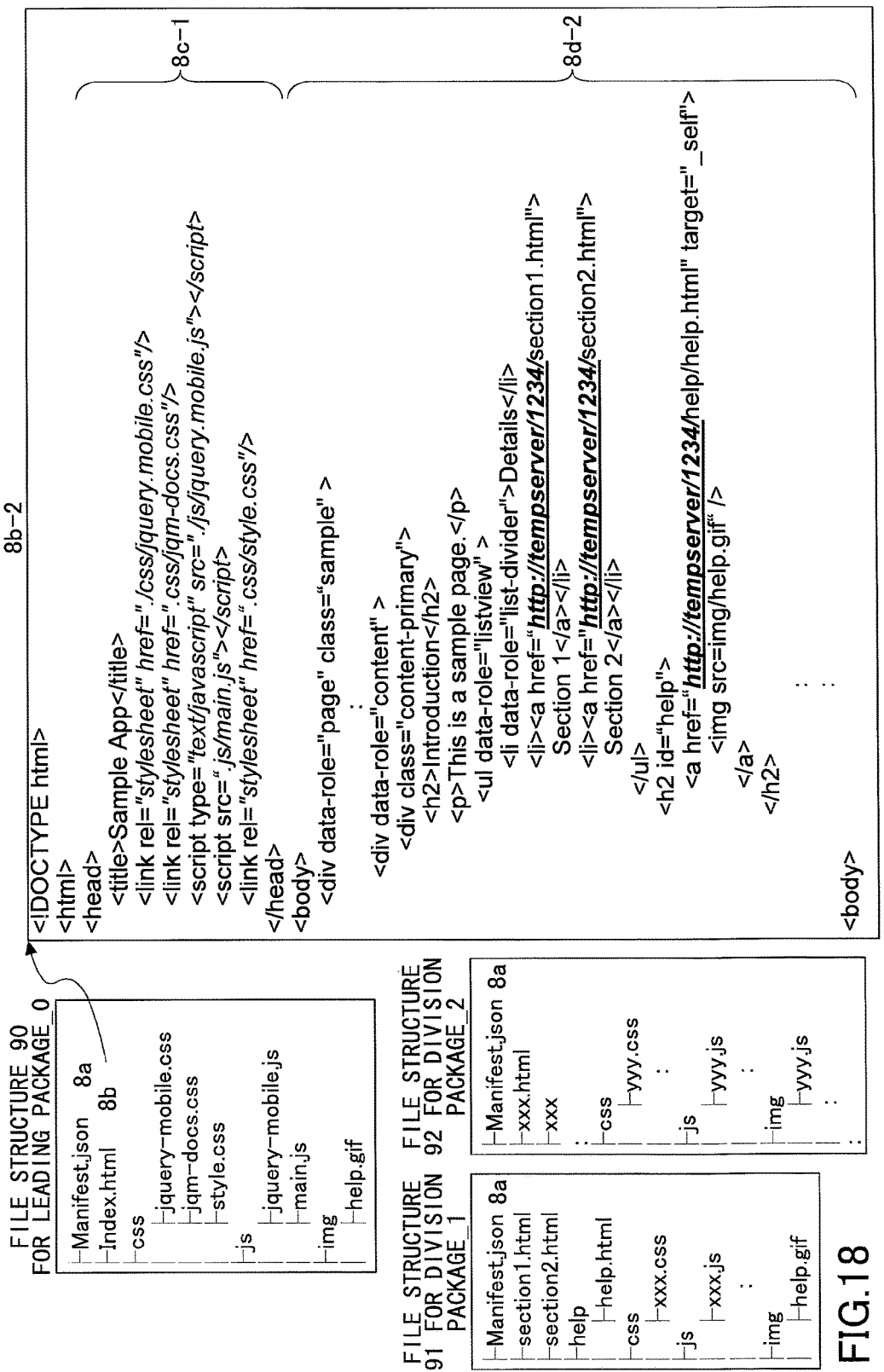
FIG. 18 illustrates an example of a file structure of each division package in a first resource acquisition method.
Figure 19:
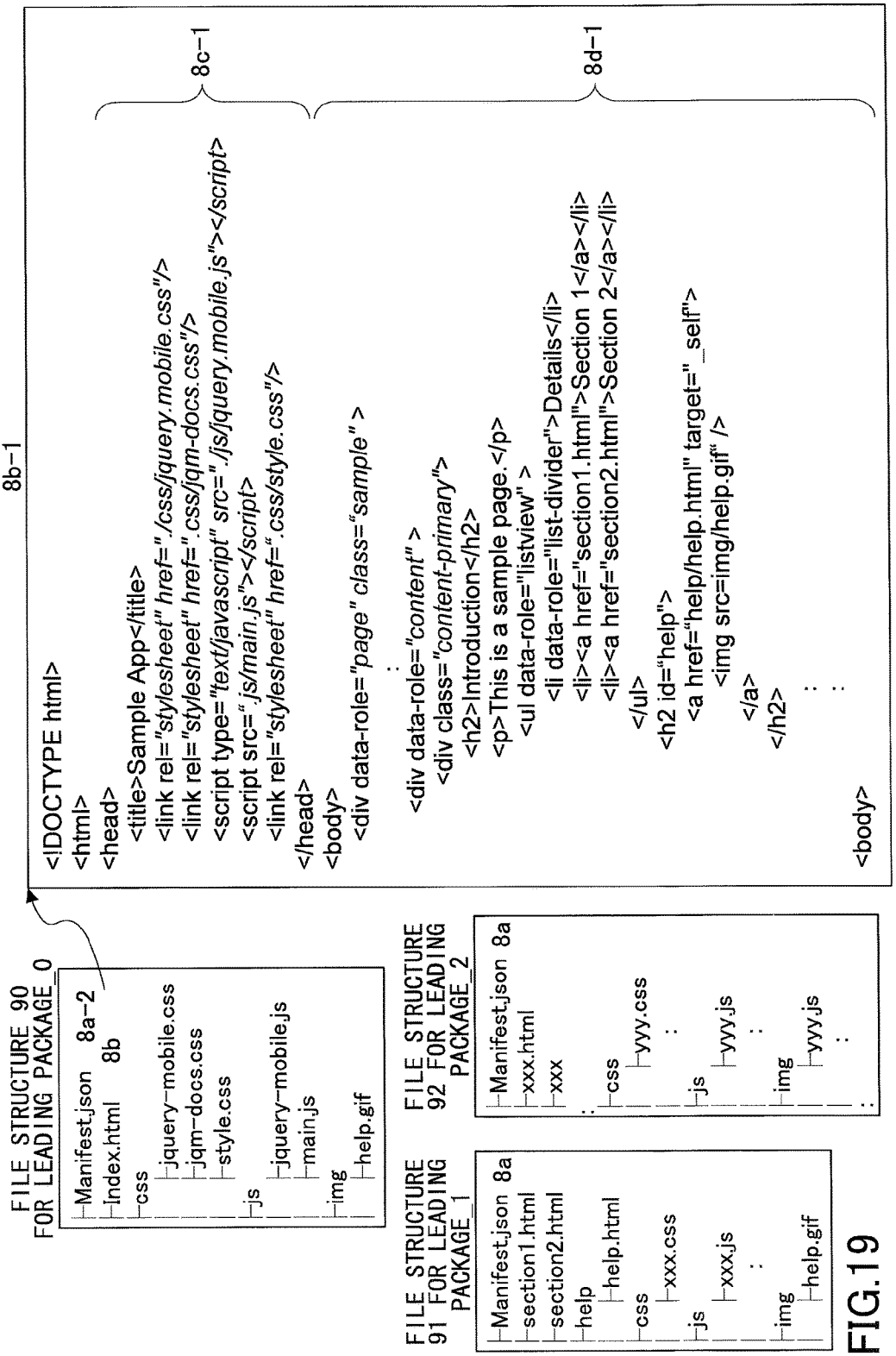
FIG. 19 illustrates an example of a file structure of each division package in a second resource acquisition method.

Next, a description is given of the file structure of the application package 7a with reference to FIGS. 17 through 19. FIG. 17 illustrates an example of the file structure of the application package 7a before being divided. In a file structure 80 illustrated in FIG. 17, the application package 7a before division (i.e., the original application package) includes manifest information 8a indicated by Manifest.json, an index file 8b for displaying a top page indicated by Index.html, a page file linked from the top page, a style sheet, JavaScript (registered trademark), and an image file.

The index file 8*b* describes source code for displaying the top page. The source code 8*b*-1 mainly includes a header part 8*c*-1 and a body part 8*d*-1.

The application package 7*a* is divided such that at least the file specified by the header part 8*c*-1 is included in the leading package_0. Furthermore, the file specified in the body part 8*d*-1 is included in the division package_1, division package_2, etc. other than the leading package_0.

In the division package_1, a resource that is likely to be immediately accessed from the top page is included with priority. In the division package_2, a resource that is directly linked from the division package_1 is included with priority. "With priority" is relevant to the transfer order.

The resource analysis unit 105 analyzes the source code 8*b*-1 of the index file 8*b* specified in the file structure 80 of FIG. 17. The resource analysis unit 105 refers to the following description in the header part 8*c*-1, to determine the file to be included in the leading package_0.

href="./css/jquery.mobile.css"
href=".css/jqm-docs.css"
src="./js/jquery.mobile.js"
src=".js/main.js"
href=".css/style.css"

Furthermore, the image file of the icon to be displayed in the top page is preferably included. Therefore, the resource analysis unit 105 refers to href="help/help.html" in the body part 8*d*-1, and identifies the image file of the icon.

Next, the resource analysis unit 105 identifies the file of the page that is linked from the top page. The resource analysis unit 105 refers to href="section1.html"
href="section2.html
href="help/help.html"

in the body part 8*d*-1, determines that these files are highly likely to be referred to next after the top page, determines that these files have high priority, and determines the file to be included in the leading package_1.

Then, the resource analysis unit 105 determines to include the remaining files other than the above, in the leading package_2. The remaining files may be further divided into two or more packages, based on the threshold at which the resource may be transferred in a single package.

The descriptions starting with "href" and "src" included in the above descriptions correspond to link information, and the files of high priority are determined by the same determination method. In this example, link information is acquired from descriptions starting with "href" and "src"; however, the method of acquiring link information is not limited to this example. The link information may be acquired from a source of JavaScript (registered trademark).

The resource analysis unit 105 reports the division unit determined as described above, to the division determination unit 104.

A description is given of a method of acquiring a first resource, by which a resource may be acquired by rewriting the link information by the division determination unit 104 in step S18-4 of FIG. 6 and step S312 of FIG. 14.

FIG. 18 illustrates an example of a file structure of each division package in the first resource acquisition method. FIG. 18 illustrates file structures 90, 91, 92 in division units. Furthermore, FIG. 18 illustrates a source code 8*b*-2 of the index file 8*b* of the file structure 90 for the leading package_0.

Each of the file structures 90, 91, 92 includes manifest information 8*a*. The index file 8*b* is preferably included in at least the leading package_0.

The file structure 90 for the leading package_0 mainly includes a style sheet and JavaScript (registered trademark) included in the header part 8*c*-1 before division, and image files of icons included in the body part 8*d*-1, which are for forming the display configuration of the top page. The file structure 91 for the leading package_1 mainly includes a file to be linked from the top page. The file structure 92 for the leading package_2 mainly includes files other than those of the leading package_0 and the leading package_1.

In the source code 8*b*-2, the header part 8*c*-1 is the same as that before division. In the body part 8*d*-2, with respect to the difference between the source code 8*b*-1 of FIG. 18, href="section1.html" is changed to
href="http://tempserver/1234/section1.html",
href="section2.html is changed to
href="http://tempserver/1234/section2.html", and
href="help/help.html" is changed to href="http://tempserver/1234/help/help.html". "http://tempserver/1234/" corresponds to a URL (Uniform Resource Locator) indicating the provisional process area 4 of the distribution server 100.

As described above, the link information is rewritten such that the resource of the hyperlink destination is not acquired from the application storage area 59 in the terminal device 5 displaying the top page, but the resource is acquired from the distribution server 100. The browser engine 52 of the terminal device 5 makes a request specifying the URL (href="http://tempserver/1234/section1.html", etc.) specifying the resource of the distribution server 100, and therefore the resource request unit 54 acquires the resource from the distribution server 100.

By rewriting the link information, in the terminal device 5, it is possible to acquire the resource of the hyperlink destination from the distribution server 100, while the downloading of the division package_1 is not completed. Therefore, even when the downloading of all of the division packages 4*p* is not completed, it is possible to operate an application.

A description is given of a second resource acquisition method, of adding a substitute URL description {substitute_url: http://tempserver/1234/} in the manifest information 8*a*, instead of rewriting the link information.

FIG. 19 illustrates an example of a file structure of each division package in the second resource acquisition method. In FIG. 19, the file structures 90, 91, 92 in division units are the same as those of the first resource acquisition method (FIG. 18). Meanwhile, the index file 8*b* of the file structure 90 of the leading package_0 is the same as the source code 8*b*-1 before division (FIG. 17).

In the second resource acquisition method, on the distribution server 100 side, in step S18-4 of FIG. 6 and step S312 of FIG. 14, the division determination unit 104 creates manifest information 8*a*-2, in which a substitute URL 8*h* (FIG. 21) is added.

On the terminal device 5 side, when the browser engine 52 attempts to access a resource such as section2.html, which is not included in the leading package_0 in the application storage area 59, the resource request unit 54 refers to the substitute URL 8*h* (FIG. 21) in the manifest information 8*a*-2, to automatically request and acquire the resource from the distribution server 100.

Next, a description is given of a data configuration of the manifest information 8*a* of the first resource acquisition method (FIG. 18). FIG. 20 illustrates a data configuration of the manifest information 8a of the first resource acquisition method. The manifest information 8a illustrated in FIG. 20 includes information such as basic information of the application 8e, developer information 8f, and package information 8g.

The basic information of the application 8e includes the name of the application, a description of the application, the entry point of the application, and the location of the icon file. The entry point of the application has the same meaning of a file path of the top page. The developer information 8f includes information relevant to the developer of the application.

The package information 8g is the information part that is added in the present embodiment, and includes a standard language and attribute information of the package. Attribute information of the package further includes the package type indicating "full" or "partial" of the application package 7a, a unique ID for identifying the package, and the division number of the application package 7a.

In the distribution server 100, when the application package 7a is divided into three packages of the leading package_0, the division package_1, and the division package_2, in the attribute of the package, "partial" is set, which indicates one part as the package type, and in the ID, "1234" is set as the ID ("partial_id") of the partial package. Furthermore, "3" is set as the division number ("partial_size").

A description is given of the data configuration of the manifest information 8a-2 in the second resource acquisition method (FIG. 19). FIG. 21 illustrates a data configuration of the manifest information 8a-2 in the second resource acquisition method. The manifest information 8a-2 illustrated in FIG. 21 includes basic information of the application 8e, developer information 8f, and package information 8g.

The basic information of the application 8e and the developer information 8f are the same as those of the manifest information 8a illustrated in FIG. 20.

The package information 8g is also the same as that of the manifest information 8a illustrated in FIG. 20, which is the information part to which information is added in the present embodiment, and includes a standard language and attribute information of the package. In the second resource acquisition method, on the distribution server 100 side, the division determination unit 104 further adds the substitute URL 8h to the package information 8g.

In the following, various modification examples of the above embodiment are described.

FIRST MODIFICATION EXAMPLE

Figure 22:
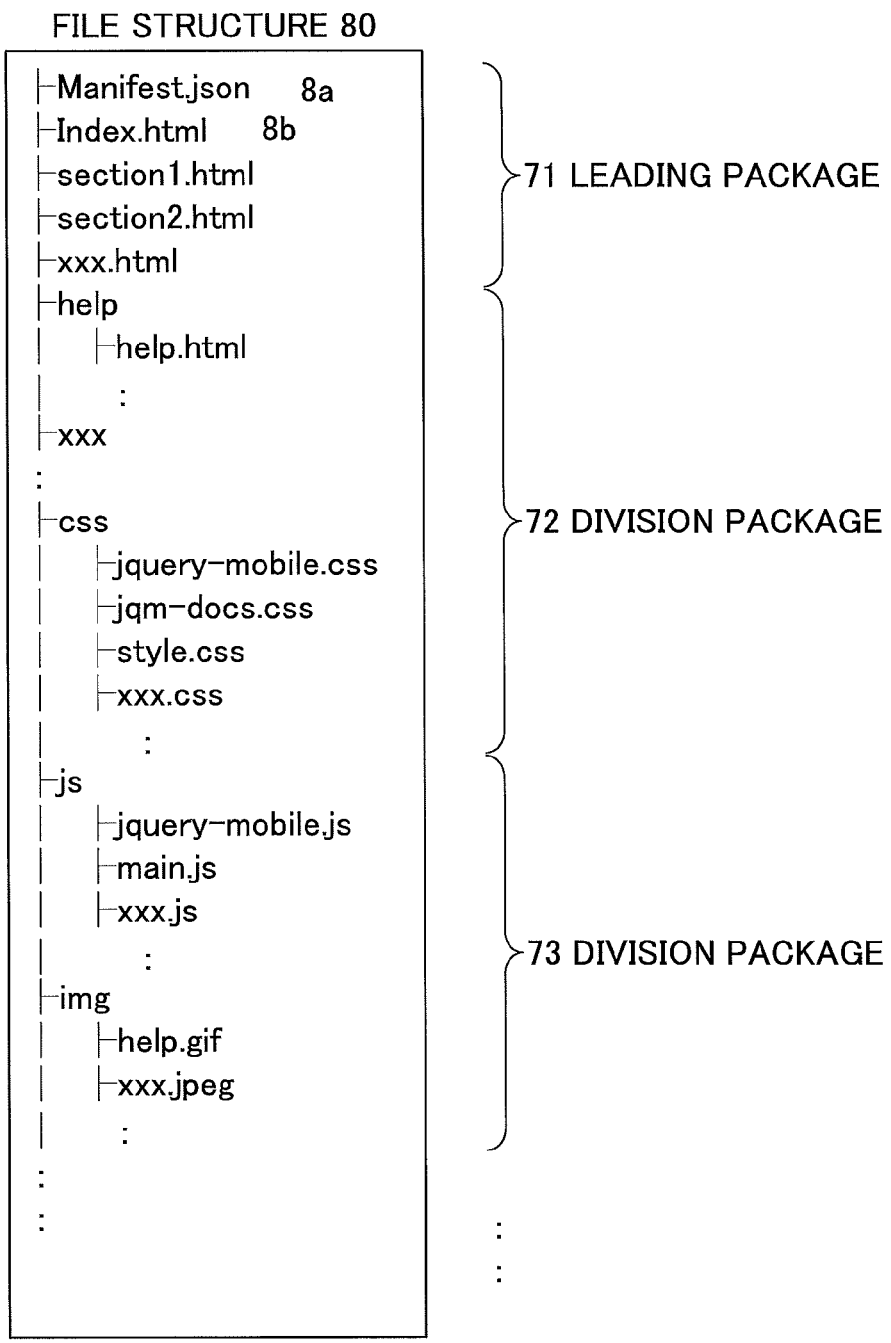
FIG. 22 is for describing a simple division method according to a first modification example.

In a first modification example, a description is given of a simple division method. FIG. 22 is for describing a simple division method according to the first modification example.

In FIG. 22, based on the file structure 80 of the application package 7a, without considering the hierarchical structure, based on the threshold of a single transfer size, the resources are assigned in an order starting from the top of the directory tree, as leading package 71-1, division package 72, division package 73 . . . .

SECOND MODIFICATION EXAMPLE

In a second modification example, when the package downloader 51 makes a request to acquire an application package (step S11 of FIG. 5 and step S201 of FIG. 10), the package downloader 51 adds information relevant to the Internet 2 to which the terminal device 5 is connected to the request and sends the request. Then, the package creation unit 102 dynamically determines the package size to be sent first, according to the status of the Internet 2.

FIGS. 23A and 23B illustrate examples of specifications of the package size according to the second modification example. FIG. 23A illustrates an example of an application package acquisition request in a case where the line type is WiFi or LTE. When the line type is WiFi or LTE, the upper limit of the package size is 2 MB, and when the line type is 3G, the upper limit of the package size is 1 MB.

As illustrated in FIG. 23A, when the line type is LTE, the application package acquisition request is performed by the following.
HTTP GET get_package?appId=1234&token=abcd&network=lte
As described above, the line type is to be specified by a variable "&network".

Alternatively, the time taken for reception by the terminal device 5 may be specified, and the package size may be determined according to the time specified by the package creation unit 102 of the distribution server 100. FIG. 23B illustrates an example of an application package acquisition request in the case where the time taken for reception is specified. In this case, the application package acquisition request is performed by the following.
HTTP GET get_package?appId=1234&token=abcd&timelimit=10s
The time taken for reception by the terminal device 5 is specified by a variable "&timelimit". The longer the time specified by the variable "&timelimit", the smaller the division package size is made by the package creation unit 102 of the distribution server 100.

THIRD MODIFICATION EXAMPLE

Figure 24:
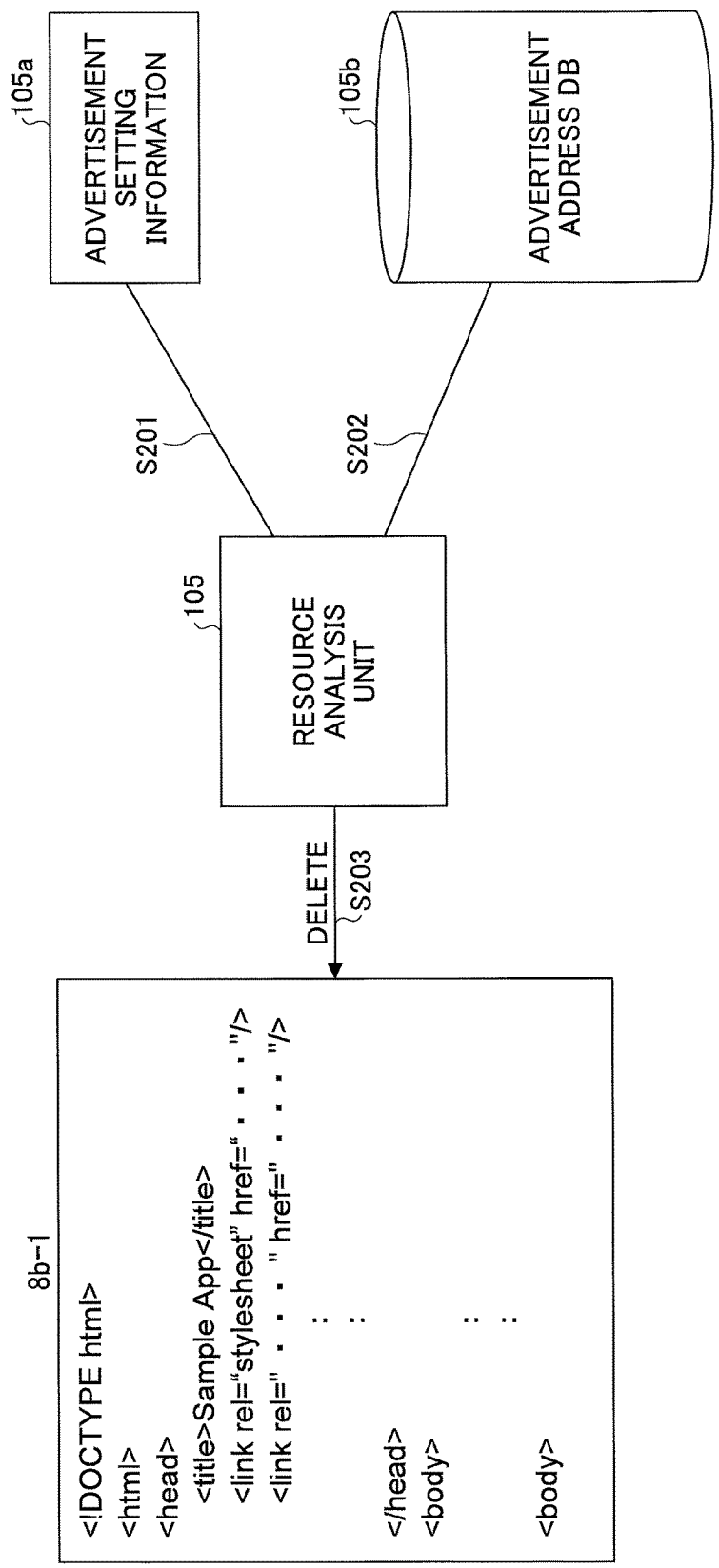
FIG. 24 illustrates a configuration example according to a third modification example.

A description is given of a third modification example, in which the resource analysis unit 105 deletes, from the application package 7a, a resource determined as advertisement contents. FIG. 24 illustrates a configuration example according to the third modification example. In FIG. 24, the distribution server 100 further stores, in the storage unit 130a, advertisement setting information 105a and an advertisement address DB 105b.

The advertisement setting information 105a is information specifying whether to include or not include an advertisement in the division package 4p. The advertisement address DB 105b is a database for managing an address of known advertisement contents, a particular tag for detecting the address, and a link dictionary.

When the advertisement setting information 105a specifies "not to include advertisement" (step S201), the resource analysis unit 105 determines whether the URL of the resource specified in the index file 8b-1 includes the URL of an advertisement server managed by the advertisement address DB 105b (step S202).

Then, when the URL of the resource in the index file 8b-1 includes a URL of an advertisement server, the resource analysis unit 105 deletes the description relevant to the URL of the resource from the index file 8b-1. This deletion may be done by rewriting the comment description.

FOURTH MODIFICATION EXAMPLE

In a fourth modification example, when the application package 7a is used in a company, contents to which access is determined to be prohibited in advance, and a website providing contents to which is access is prohibited, are managed by an access prohibition DB 105*d*, so that these contents are not included in the division package 4*p* of the application package 7*a*.

Figure 25:
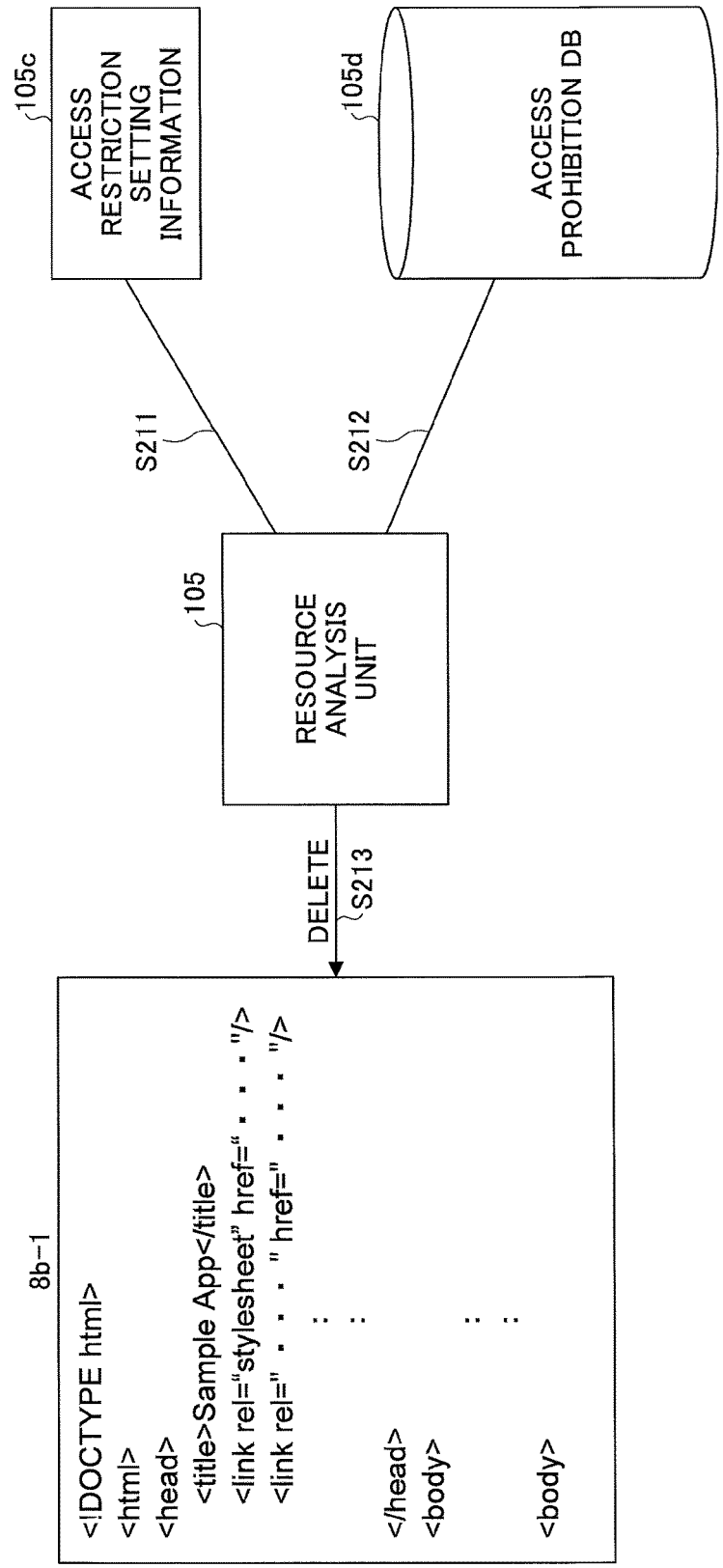
FIG. 25 illustrates a configuration example according to a fourth modification example.

FIG. 25 illustrates a configuration example according to the fourth modification example. In FIG. 25, the distribution server 100 further stores, in the storage unit 130*a*, access restriction setting information 105*c* and the access prohibition DB 105*d*.

The access restriction setting information 105*c* is information specifying whether to include or not include information to which access is restricted, in the division package 4*p*. The access prohibition DB 105*d* is a database for managing URLs of resources to which access is prohibited.

When the access restriction setting information 105*c* is specifying "not to include information to which access is restricted" (step S211), the resource analysis unit 105 determines whether the URL of the resource specified in the index file 8*b*-1 includes the URL of information to which access is restricted, managed by the access prohibition DB 105*d* (step S222).

Then, when a URL of resource in the index file 8*b*-1 includes the URL of information to which access is restricted, the resource analysis unit 105 deletes the description relevant to the URL of the resource from the index file 8*b*-1. This deletion may be done by rewriting the comment description.

FIFTH MODIFICATION EXAMPLE

Figure 26:
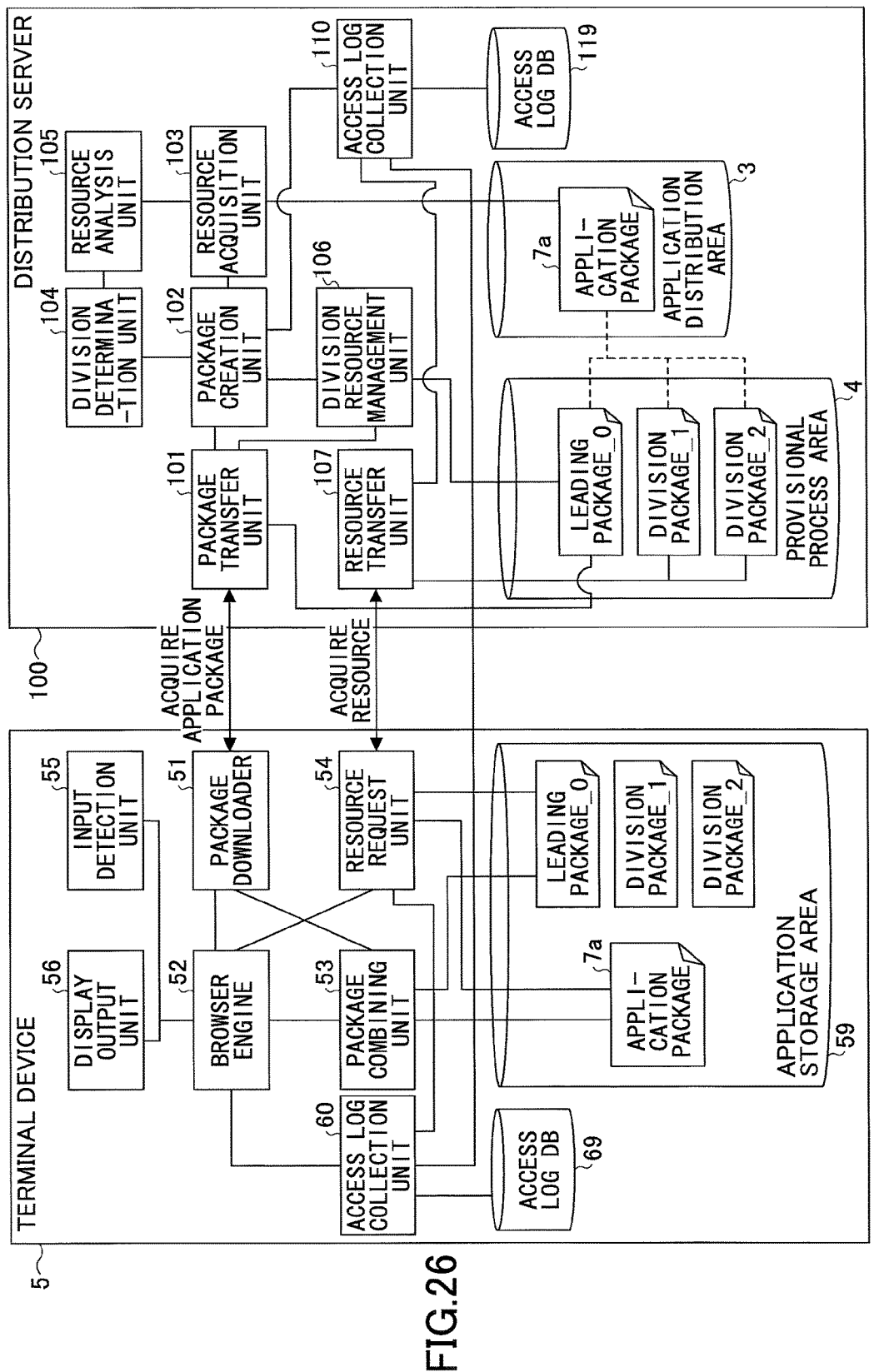
FIG. 26 illustrates a functional configuration example according to a fifth modification example.

A description is given of a fifth modification example, of including, with priority, a resource (i.e., contents) that is frequently accessed, in the leading package_0 among the division packages 4*p*. FIG. 26 illustrates a functional configuration example according to the fifth modification example. The difference between the functional configuration of FIG. 26 and the functional configuration of FIG. 4 is that the distribution server 100 and the terminal device 5 are capable of collecting access logs in FIG. 26.

In addition to the functional configuration of FIG. 4, the distribution server 100 includes an access log collection unit 110, and the storage unit 130*a* further stores an access log DB 119. Furthermore, in addition to the functional configuration of FIG. 4, the terminal device 5 includes an access log collection unit 60, and the storage unit 130*b* further stores an access log DB 69.

In the terminal device 5, the access log collection unit 60 records, in the access log DB 69, log information relevant to the resource, in response to a log record request received from the browser engine 52 and the resource request unit 54, respectively. The access log collection unit 60 transfers the log information to the distribution server 100 at predetermined time intervals.

In the terminal device 5, log information relevant to resources accessed in the display output unit 56 and resources for which resource acquisition requests have been made to the distribution server 100, is recorded in the access log DB 69.

In the distribution server 100, the access log collection unit 110 stores the log information received from the terminal device 5, in the access log DB 119. Furthermore, the access log collection unit 110 creates statistical information expressing the access frequency to each resource, and provides the statistical information in response to a request from the package creation unit 102.

Alternatively, in the distribution server 100, log information relevant to the resource may be recorded in response to a log record request from the resource transfer unit 107. By recording the log information from the resource transfer unit 107, it is possible to recognize the division package 4*p* for which many resource access requests are made, the division package 4*p* for which few resource access requests are made, or the division package 4*p* for which no resource access requests are made.

The package creation unit 102 may determine the resource to be included in each division package 4*p*, based on the statistical information from the access log collection unit 110. The package creation unit 102 creates the division package 4*p*, such that the resource (i.e., contents) that is frequently accessed, is included in the leading package_0.

When sending a new application package 7*a* upon being divided to the terminal device 5, it is possible to efficiently select the resource. In the terminal device 5, it is possible to reduce data transfer processes relevant to acquiring the resource. Furthermore, the resource specified by the user may be immediately displayed, and therefore the convenience of the user is improved.

FIG. 27 illustrates a data configuration example of the access log DB 69 of the terminal device 5. In FIG. 27, the access log DB 69 of the terminal device 5 includes items such as an application ID, the time, the division state, the activation state, the accessed resource, and the resource type. The access log DB 69 is sent to the distribution server 100 by the access log collection unit 60, and is analyzed by the access log collection unit 110.

The application ID is an identifier for identifying the application package 7*a*. The time is the time at which an event has occurred, such as a division state, an activation state, and resource access. In this example, the time is indicated in a format of year/month/day:hour:minute:second:millisecond.

The division state indicates a list of division package numbers for identifying the downloaded division package 4*p*. The activation state indicates whether the application has been activated or terminated. The accessed resource indicates the resource to which access has been made during the execution of the application.

The resource type indicates either a local access to the application storage area 59 of the storage unit 130*b* in the terminal device 5, or a remote access to the distribution server 100. In the case of a local access, "L" is indicated. In the case of a remote access, "R" is indicated.

In the data example illustrated in FIG. 27, with respect to the application ID "1234", in a state where only the division package number "1" (corresponding to the leading package_0) is acquired, there is a record 69*a* indicating that the resource type is "R". The accessed resource "example4.html" of the record 69*a* indicates that access has been made to a resource that is not included in the leading package_0.

In the fifth modification example, with respect to the next application package acquisition request, the resource "example4.html" is included in the leading package_0. Therefore, in the terminal device 5, it is possible to acquire the resource "example4.html" at an early stage, and therefore accesses to resources may be efficiently made.

SIXTH MODIFICATION EXAMPLE

In the sixth modification example, in the functional configuration according to the fifth modification example illustrated in FIG. 26, a resource (i.e., contents), which is not accessed even though the resource has been included in the leading package_0, is not included in the leading package_0 at the time of the next application package acquisition request.

In a record indicating only a division state "1" in the access log DB 69 illustrated in FIG. 27, when there is a resource which is not accessed even though the resource has been included in the leading package_0, the package creation unit 102 does not include this resource in the leading package_0 at the time of the next application package acquisition request. The package creation unit 102 includes the resource in a division package 4*p* other than the leading package_0.

By the sixth modification example, a resource that is accessed at a low frequency may be transferred afterwards.

SEVENTH MODIFICATION EXAMPLE

In the seventh modification example, in the process of sending the division package 4*p* of the second package and onwards after the leading package_0, when there is a request to acquire a resource in a remaining division package 4*p*, the division package 4*p* including the request resource is sent ahead of the other packages, and executed.

Figure 28:
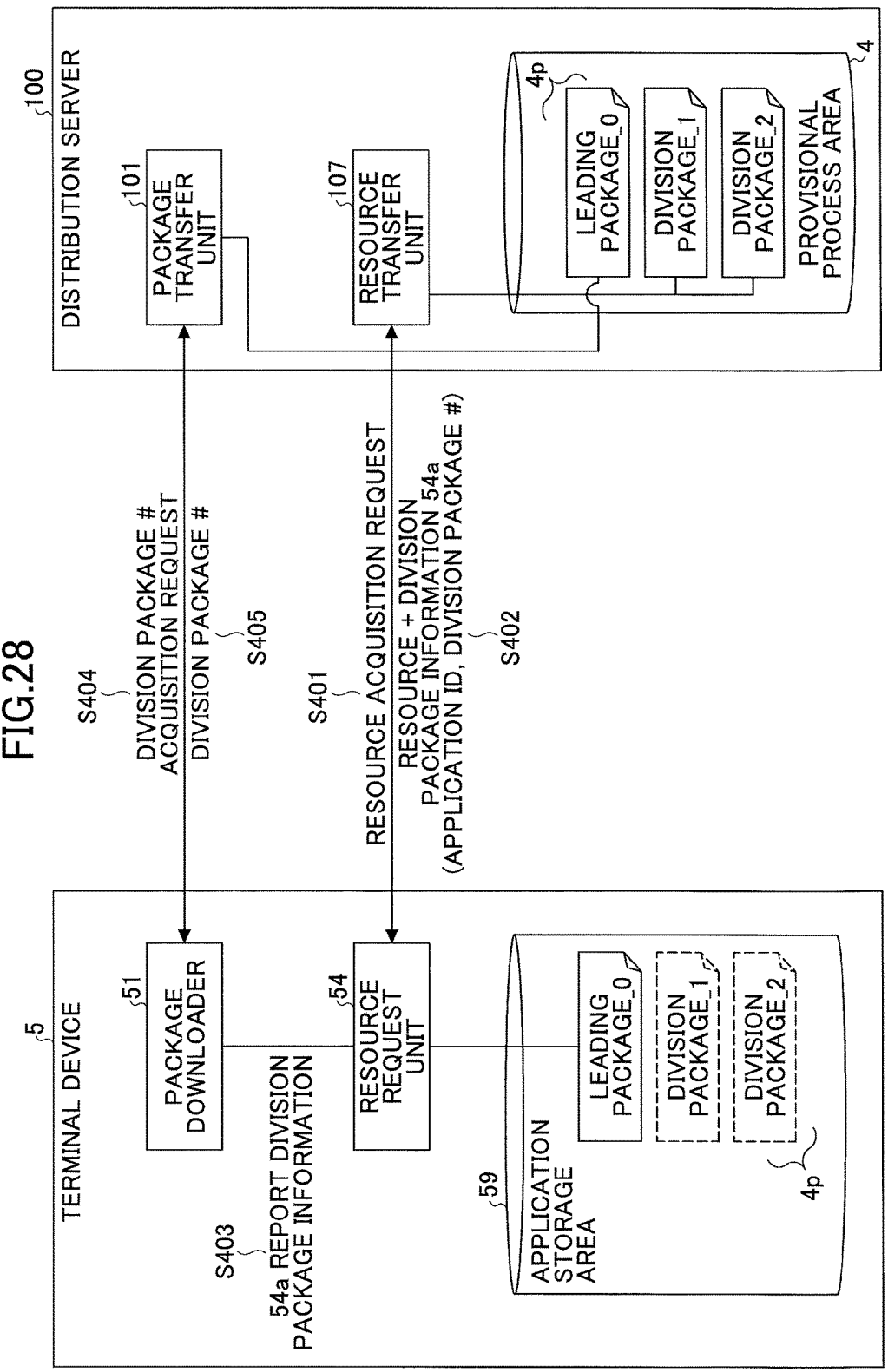
FIG. 28 illustrates a first method of sending a division package according to a seventh modification example.

The seventh modification example may be realized by a first method or a second method described below. First, a description is given of a first method. FIG. 28 illustrates a first method of sending a division package according to the seventh modification example. In FIG. 28, processing units needed for the description are illustrated, and other units are omitted. Furthermore, it is assumed that the application package 7*a* is transferred upon being divided into a leading package_0, a division package_1, and a division package_2.

With reference to FIG. 28, a description is given of a case where the user has performed an operation of requesting a resource, from a top page displayed in the display screen 5*a* after downloading the leading package_0. In a state where neither the division package_1 nor the division package_2 is downloaded, it is assumed that a request has been made for a resource included in the division package_2, to the resource transfer unit 107 of the distribution server 100, from the resource request unit 54 of the terminal device 5 (step S401).

When sending the requested resource to the resource request unit 54, the resource transfer unit 107 adds division package information 54*a* to the resource (step S402). The division package information 54*a* includes information such as the application ID and the division package #. The division package # is a number for identifying the division package 4*p* including the resource.

The resource request unit 54 reports the division package information 54*a* received in step S402 to the package downloader 51 (step S403).

The package downloader 51 makes a division package # acquisition request to the package transfer unit 101, based on the division package information 54*a* (step S404). Then, the package downloader 51 acquires the division package 4*p* including the resource requested at step S401 by the distribution server 100 (step S405). The division package 4*p* that the package downloader 51 has downloaded is stored in the application storage area.

Figure 29:
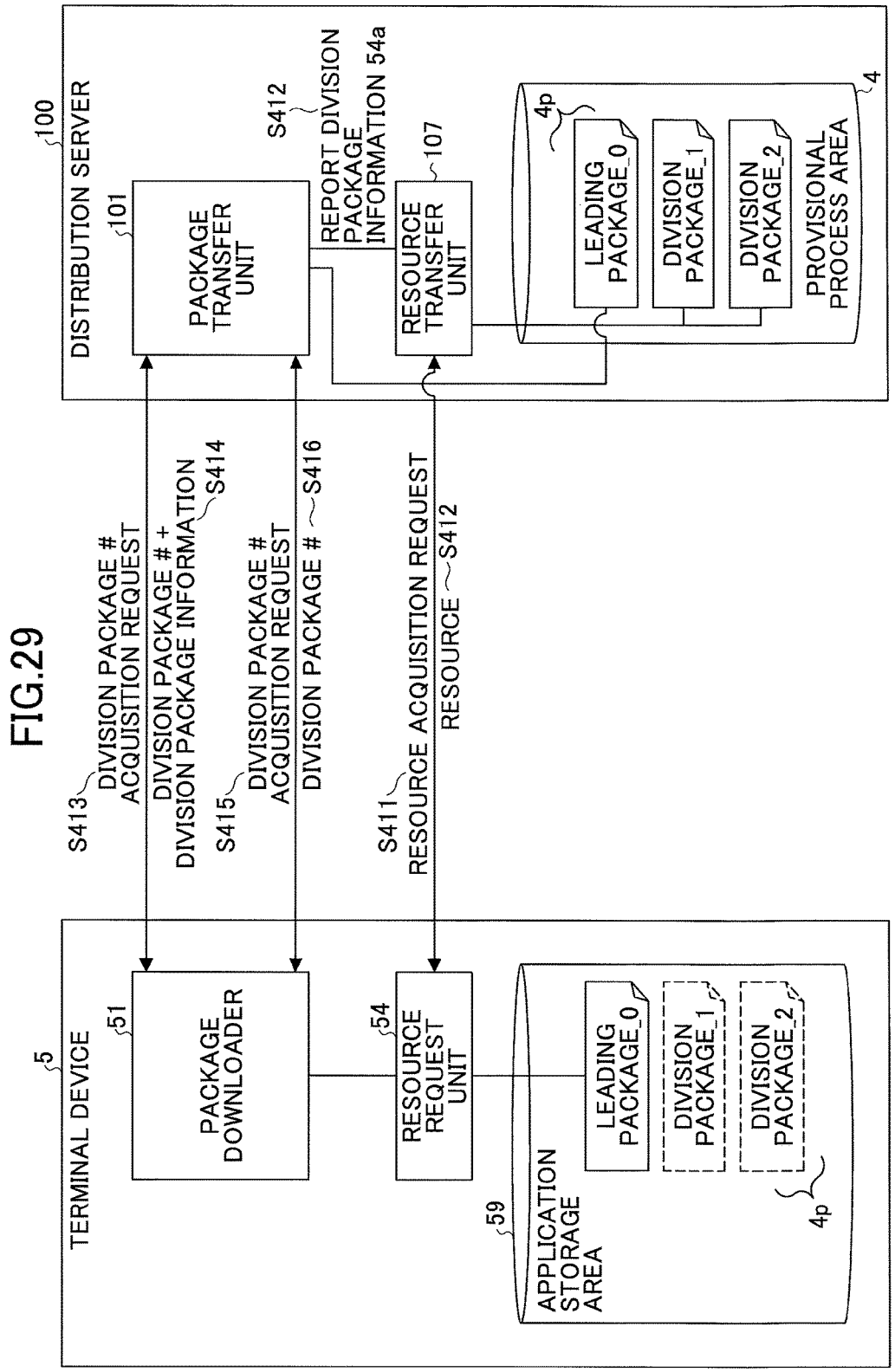
FIG. 29 illustrates a second method of sending a division package according to the seventh modification example.

Next, a description is given of the second method. FIG. 29 illustrates a second method of sending a division package according to the seventh modification example. In FIG. 29, processing units needed for the description are illustrated, and other units are omitted. Furthermore, it is assumed that the application package 7*a* is transferred upon being divided into a leading package_0, a division package_1, and a division package_2.

With reference to FIG. 29, a description is given of a case where the user has performed an operation of requesting a resource, from a top page displayed in the display screen 5*a* after downloading the leading package_0. In a state where neither the division package_1 nor the division package_2 is downloaded, it is assumed that a request has been made for a resource included in the division package_2, to the resource transfer unit 107 of the distribution server 100, from the resource request unit 54 of the terminal device 5 (step S411).

The resource transfer unit 107 of the distribution server 100 sends the requested resource to the resource request unit 54 of the terminal device 5 (step S412). In step S412, the resource transfer unit 107 also reports the division package information 54*a* to the package transfer unit 101.

The division package information 54*a* includes information such as the application ID and the division package #. The division package # is a number for identifying the division package 4*p* including the resource.

Meanwhile, the package downloader 51 of the terminal device 5 makes a division package # acquisition request to the distribution server 100 (step S413).

The package transfer unit 101 adds the division package information 54*a* reported from the resource transfer unit 107 in step S412 to the division package 4*p* that is to be sent in response to the division package # acquisition request, and sends the division package 4*p* to the package downloader 51 of the terminal device 5 (step S413).

The package downloader 51 sends the division package # acquisition request to the package transfer unit 101 based on the division package information 54*a* received from the distribution server 100 (step S415), and acquires the division package 4*p* including the resource requested at step S411 (step S416). The division package 4*p* that has been downloaded by the package downloader 51 is stored in the application storage area.

In the first and second methods described above, a re-packaging request may be made to the package creation unit 102, at the time point when the resource transfer unit 107 receives a resource acquisition request. In this case, in response to the re-packaging request, the package creation unit 102 re-creates a division package including the resource specified in the resource acquisition request by a minimum size, and reconstructs remaining division packages 4*p*.

EIGHTH MODIFICATION EXAMPLE

In an eighth modification example, a description is given of a method of sending the division package 4*p*, when distributing a plurality of applications.

Method 1: When the package downloader 51 of the terminal device 5 simultaneously makes application package acquisition requests for three application packages app1, app2, and app3, the package downloader 51 first requests the leading package_0 of the respective application packages app1, app2, and app3.

Method 2: When the user of the terminal device 5 first activates the application package app2, the browser engine 52 reports to the package downloader 51 that the activation of the application package app2 has been detected, and the package downloader 51 requests the package transfer unit 101 of the distribution server 100 to send, with priority, the division packages 4*p* of the application package app2.

In this case, the package transfer unit 101 determines that the application packages app1 and app3 are unlikely to be immediately used, and requests the package creation unit 102 to recreate the packages such that the division units of the application packages app1 and app3 are large.

To each division package 4p, additional information other than the actual resource is added, and therefore, the smaller the division unit, the larger the total size of the plurality of division packages 4p with respect to a single application package. By recreating the division packages 4p of the application packages app1 and app3 by the package creation unit 102, it is possible to reduce the labor hour of assembly and the transmission amount.

Method 3: When an assembly of a plurality of applications is managed as a group, and the order of activating the applications is determined in advance, the application to be activated first may be divided into small packages, and the remaining a applications may be divided into large packages.

Figure 30:
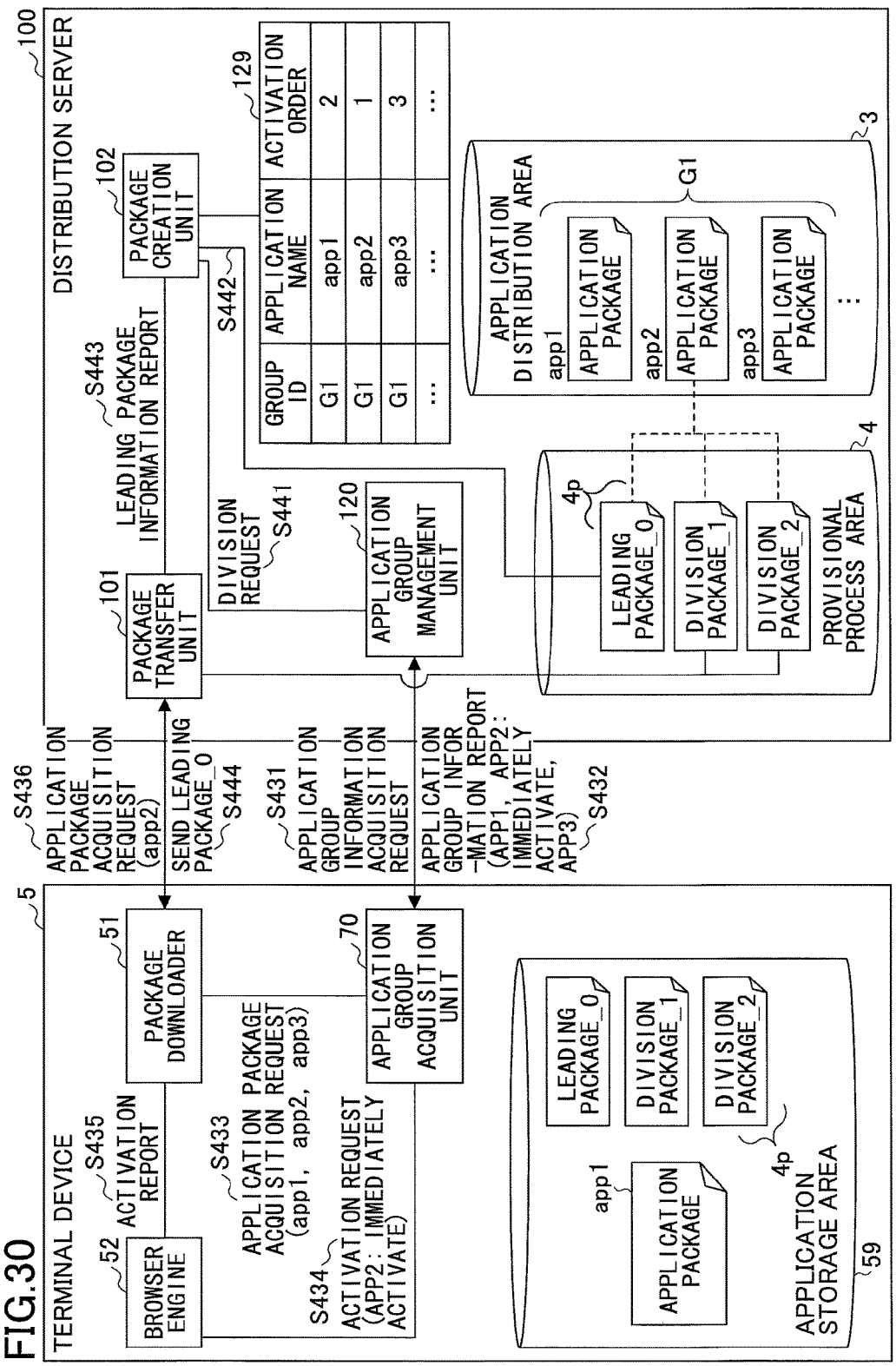
FIG. 30 illustrates a functional configuration example of method 3 according to an eighth modification example.

FIG. 30 illustrates a functional configuration example of method 3 according to the eighth modification example. In FIG. 30, the distribution server 100 further include an application group management unit 120, in addition to the configuration of FIG. 4 or FIG. 26. Furthermore, the storage unit 130a stores an application group list 129. Similarly, the terminal device 5 further includes an application group acquisition unit 70, in addition to the configuration of FIG. 4 or FIG. 26. In FIG. 30, only elements that are needed for describing the eighth modification example are illustrated.

In response to an application group information acquisition request from the terminal device 5, the application group management unit 120 of the distribution server 100 reports applications of the same group to the terminal device 5.

The application group list 129 manages the grouping of the application packages app1, app2, and app3, and the order of activation within the group. As to the activation order, "1" indicates the highest priority, and the larger the value, the lower the priority level.

In the example of FIG. 30, application packages app1, app2, and app3 are grouped in group G1. The activation order in group G1 is that the application package app1 is first, the application package app2 is second, and the application package app3 is third.

The application group acquisition unit 70 of the terminal device 5 acquires application group information from the distribution server 100.

In the terminal device 5, the application group acquisition unit 70 acquires application group information from the distribution server 100.

In the terminal device 5, the application group acquisition unit 70 makes an application group information acquisition request to the distribution server 100 (step S431).

In the distribution server 100, the application group management unit 120 refers to the application group list 129, creates application group information indicating the application name of group G1, and sends the application group information to the application group acquisition unit 70 of the terminal device 5 (step S432). The application group management unit 120 includes, in the application group information, information indicating "immediately activate" in association with the application name whose activation order in group G1 is "1".

In the terminal device 5, the application group acquisition unit 70 makes an application package acquisition request to the package downloader 51, by the application name specified by the application group information (step S433). Furthermore, the application group acquisition unit 70 makes an activation request to the browser engine 52 for the application name whose activation order is indicating "immediately activate", based on the application group information (step S434).

The browser engine 52 reports to the package downloader 51 that the activation of the application package app2 has been detected, in response to the activation request from the application group acquisition unit 70 (step S435). The package downloader 51 makes a request to acquire the application package app2 that is reported from the browser engine 52, among the application packages app1, app2, and app3 specified in the application package acquisition request from the application group acquisition unit 70 (step S436).

Meanwhile, in the distribution server 100, the application group management unit 120 sends application group information to the application group acquisition unit 70 of the terminal device 5 (step S432), and then makes a division request of the application packages app1, app2, and app3 in group G1, to the package creation unit 102 (step S441). By the division request, the group ID is to be reported.

Based on the activation order in the group G in the application group list 129, the package creation unit 102 divides the application packages by making the leading package_0 of the application package app2 having the first activation order to have a small size, and by making the leading package_0 of the application packages app2 and app3 having lower rank orders in the activation order to have a size that is larger than the leading package_0 of the application package app2 (step S442). As described above, as the activation order is higher, the application is divided into smaller packages, such that the terminal device 5 may quickly complete the downloading and activate the application.

The package creation unit 102 makes a leading package information report to the package transfer unit 101 (step S443). The package transfer unit 101 sends the division package 4p to the terminal device 5, based on the leading package information report (step S444).

In method 3 described above, when the activation order of the application packages app1, app2, and app3 is not set, in the terminal device 5, a list of application icons in group G is likely to be displayed first. Therefore, the display of application icons is set to be performed first. The package creation unit 102 creates the leading package_0 of the respective packages in the group G1 to have a small size, and performs method 1 described above.

The terminal device 5 is able to acquire the leading package_0 of all application packages app1, app2, and app3 in group 1 at an early stage in the downloading process, and therefore the list of application icons may be immediately displayed on the display screen 5a.

Furthermore, even when the distribution server 100 simultaneously receives a plurality of application package acquisition requests from the terminal device 5, the packages are preferably efficiently transferred. Therefore, for a division package 4p of an application package having a high activation order, the package transfer unit 101 may assign many bands when sending the packages. For example, 1 Mbps is assigned for the application package app2 having a high activation order, and 256 Kbps is assigned for the application package app3 having a low activation order.

In addition to the configuration of FIG. 30, the package transfer unit 101 includes a timer in the distribution server 100, and the activation of the application in the terminal device 5 is reported to the distribution server 100.

In this case, the package transfer unit 101 monitors the passage of time from when the first division package 4p is sent to when the activation of the application is reported. When a report is not received within a certain time period, the package transfer unit 101 makes a package recreation request to the package creation unit 102, to increase the size of the remaining division packages 4p.

It is possible to perform data transfer of the division package 4p, in accordance with the activation status of the application in the terminal device 5.

NINTH MODIFICATION EXAMPLE

In the ninth modification example, the package downloader 51 of the terminal device 5 is able to acquire information of the division package 4p, without decompressing the zip file of the acquired division package 4p. The package is divided by the name rule of the URL, such that the division URL may be determined.

Figure 31:
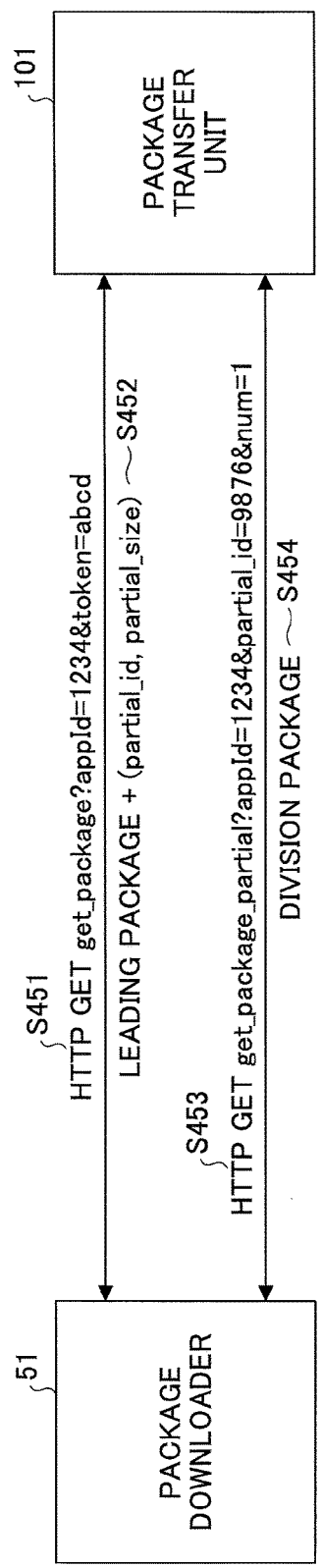
FIG. 31 illustrates a ninth modification example.

FIG. 31 illustrates the ninth modification example. In FIG. 31, the package downloader 51 makes an application package acquisition request (step S451). The application package acquisition request is made by the following, for example.

HTTP GET get_package?appId=1234&token=abcd

The package transfer unit 101 sends the package in a multi-part format, including the leading package_0 and also partial_id and partial_size, in response to the application package acquisition request (step S452). The partial_id indicates the division package number. The partial_size indicates the size of the division package.

The package downloader 51 refers to the partial_id and partial_size sent from the package transfer unit 101, and makes a division package acquisition request specifying the division package 4p to be requested next (step S453). The package transfer unit 101 sends the division package 4p specified in the division package acquisition request (step S454).

When sending the division package 4p, the package transfer unit 101 includes the partial_id and partial_size of the next division package 4p, in the division package 4p that is sent. Accordingly, the package downloader 51 is able to make a request to acquire the next division package 4p without decompressing the zip file of the division package 4p. Thus, the speed of executing the application is increased.

TENTH MODIFICATION EXAMPLE

In the tenth modification example, a regular web page is processed and sent to the terminal device 5, such that the web page may be managed as a Packaged Web App in the terminal device 5.

Figure 32:
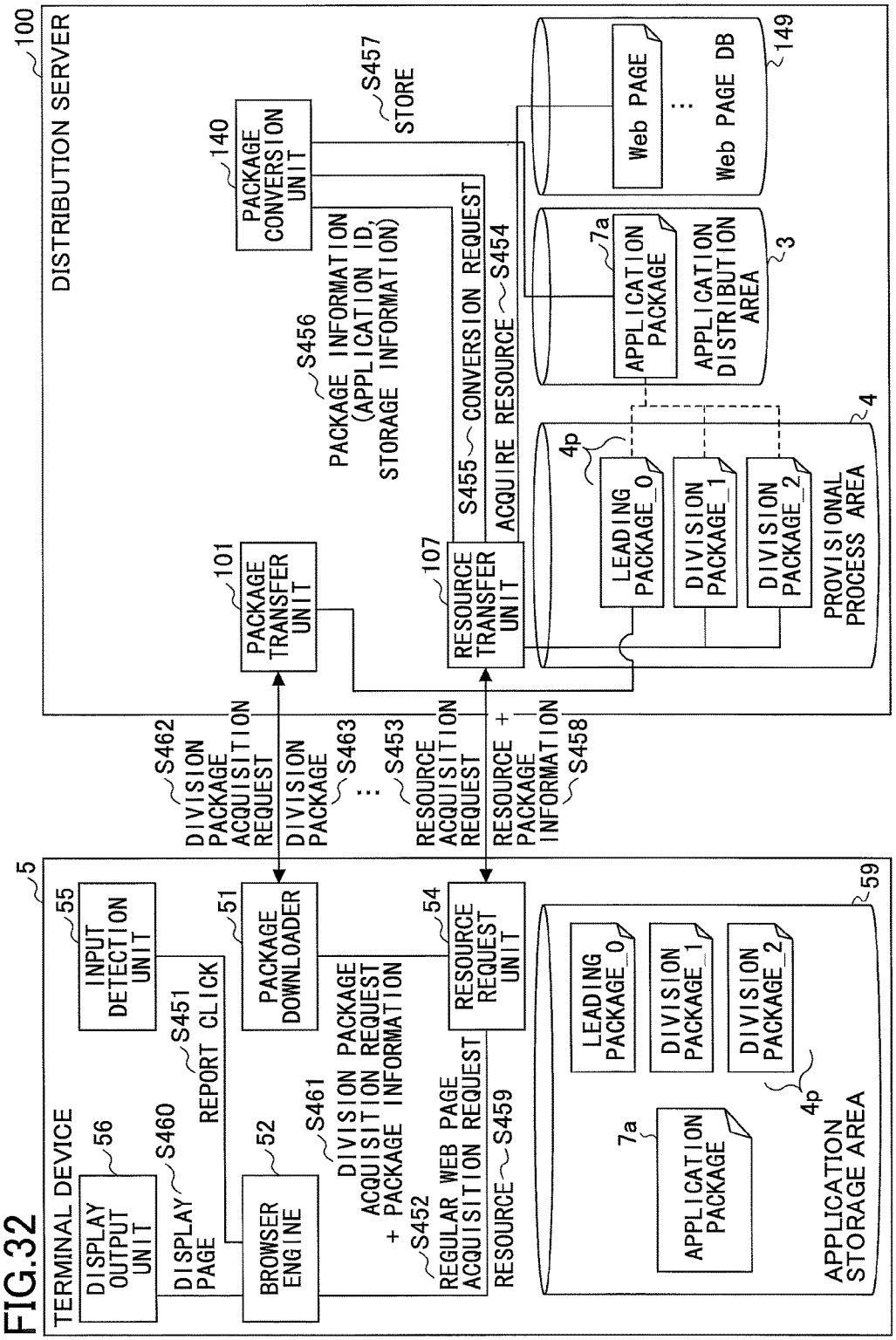
FIG. 32 illustrates a functional configuration example according to a tenth modification example.

FIG. 32 illustrates a functional configuration example according to the tenth modification example. In FIG. 32, the distribution server 100 further includes a package conversion unit 140, in addition to the configuration of FIG. 4 or 26. Furthermore, the storage unit 130a stores a web page DB 149. The terminal device 5 may have the configuration of FIG. 4 or 26. In FIG. 32, only elements that are needed for describing the tenth modification example are illustrated.

When the user clicks the link to a particular web page via the input device 14a, the input detection unit 55 reports the click of the link to the web page, to the browser engine 52 (step S451).

The browser engine 52 makes a regular web page acquisition request to the resource request unit (step S452). The resource request unit 54 makes a resource acquisition request to the resource transfer unit 107 of the distribution server 100 (step S453). The resource acquisition request specifies the resource clicked by the user.

In the distribution server 100, the resource transfer unit 107 acquires the resource specified by the resource acquisition request from the web page DB 149 (step S454), and makes a conversion request to the package conversion unit 140 to convert the web page set including the acquired resource, into a package format (step S455).

The package conversion unit 140 generates the application package 7a by packaging the resource set acquired from the web page DB 149, in response to the resource acquisition request from the resource transfer unit 107, and stores the application package 7a in the application distribution area 3 (step S457).

Then, the package conversion unit 140 reports the package information of the generated application package 7a, to the resource transfer unit 107 (step S456). The package information includes an application ID and storage information indicating the storage location where the application package 7a is stored.

The resource transfer unit 107 adds the package information reported from the package conversion unit 140 in step S456, to the resource acquired in step S454, and sends the resource to the resource request unit 54 of the terminal device 5 (step S458).

In the terminal device 5, the resource request unit 54 provides the resource provided from the distribution server 100, to the browser engine 52 (step S459). When the resource is received from the resource request unit 54 (step S459), the browser engine 52 causes the user interface 15b to display the page of the resource, via the display output unit (step S460).

Furthermore, the resource request unit 54 makes a division package acquisition request together with the package information, to the package downloader 51 (step S461).

The package downloader 51 makes a division package acquisition request to the package transfer unit 101 of the distribution server 100 (step S462). Thereafter, as described with reference to FIGS. 5 through 8, requests and acquisitions for the division package 4p of the application package 7a are performed between the package downloader 51 and the package transfer unit 101, as described with reference to FIGS. 5 through 8.

As described above, according to the present embodiment, and the first through tenth modification examples, even when the application package (Packaged Web App) 7a has a large size, the user is able to immediately execute the application without waiting for a long time, and the user is also able to use the application without stopping the execution.

Furthermore, even if the remaining division packages 4p are not yet received, it is possible to acquire a resource from the distribution server 100, and therefore the user is able to use the application without interrupting the process.

Furthermore, according to the present embodiment, and the first through tenth modification examples, the functions of the browser of the terminal device 5 are unaffected, and therefore implementation is easily performed.

According to an aspect of the embodiments, an application is divided and transferred, and it is possible to immediately execute a program.

The present invention is not limited to the specific embodiments described herein, and variations and modifications may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distribution method executed by a computer, the distribution method comprising:
   dividing, by a distribution server connected to a terminal device via a network, a program in response to receiving a program acquisition request from the terminal device; and
   transferring, by the distribution server, the divided program to the terminal device,
   wherein the dividing includes
   dividing, by the distribution server, the program into a leading part that activates the program and at least one remaining part other than the leading part, and
   rewriting, by the distribution server, link information included in the leading part to indicate a location of a resource of a page linked from a top page, to be displayed on the terminal device by the leading part, into revised link information indicating a web address of the resource in the distribution server on the network,
   wherein the transferring includes
   transferring, by the distribution server, the leading part to the terminal device, with priority higher than that of the at least one remaining part, and
   wherein, when the leading part is transferred to the terminal device, activating the leading part with the revised link information at the terminal device, acquiring the resource of the top-page-linked page from the distribution server via the network, and displaying the top page with the acquired resource of the top-page-linked page before the at least one remaining part is transferred to the terminal device.

2. The distribution method according to claim 1, further comprising:
   sending, by the distribution server, a resource to the terminal device in response to receiving a resource acquisition request from the leading part activated at the terminal device.

3. The distribution method according to claim 1, wherein the dividing includes:
   dividing, by the distribution server, the program based on a file structure of the program.

4. The distribution method according to claim 1, further comprising:
   determining, by the distribution server, a package size based on information relevant to a status of the network, in response to receiving the program acquisition request to which the information relevant to the status of the network is attached.

5. The distribution method according to claim 4, wherein the information relevant to the status of the network includes network status information indicating a line type of the network or a time to be taken for reception by the terminal device.

6. The distribution method according to claim 1, further comprising:
   deleting, by the distribution server, predetermined specific information from the program.

7. The distribution method according to claim 6, wherein the deleting includes:
   deleting, by the distribution server, advertisement information relevant to an advertisement included in the program, by referring to an advertisement address database storing the advertisement information.

8. The distribution method according to claim 6, wherein the deleting includes:
   deleting, by the distribution server, access-restricted information included in the program, by referring to an access prohibition database storing the access-restricted information.

9. The distribution method according to claim 2, further comprising:
   determining, by the distribution server, whether to include the resource in the leading part or in the at least one remaining part, based on a frequency of reception of the resource acquisition request from the terminal device.

10. The distribution method according to claim 9, further comprising:
    including, by the distribution server, in the leading part with priority, the resource for which the resource acquisition request is frequently received, based on the frequency of reception of the resource acquisition request.

11. The distribution method according to claim 9, further comprising:
    including, by the distribution server, the resource, which is included in the leading part, in the at least one remaining part in a next time of sending the resource to the terminal device, when the resource acquisition request is not received for the resource included in the leading part within a predetermined interval, based on the frequency of reception of the resource acquisition request.

12. The distribution method according to claim 2, wherein the sending includes:
    sending, by the distribution server, the resource to the terminal device by attaching, to the resource, part information relevant to the at least one remaining part including the resource, when the resource acquisition request is received while transferring the at least one remaining part to the terminal device.

13. The distribution method according to claim 2, wherein the sending includes:
    sending, by the distribution server, the resource to the terminal device in response to receiving the resource acquisition request, when the resource acquisition request is received while transferring the at least one remaining part to the terminal device; and
    sending, by the distribution server, a next one of the at least one remaining part to the terminal device by attaching, to the next one of the at least one remaining part that is specified in a second program acquisition request to acquire the next one of the at least one remaining part, part information relevant to the at least one remaining part including the resource, in response to receiving the second program acquisition request from the terminal device.

14. The distribution method according to claim 12, wherein the sending further includes:

creating, by the distribution server, the at least one remaining part including the resource to have a minimum size.

15. The distribution method according to claim 1, further comprising:
sending, by the distribution server, with priority, a leading part of each of a plurality of programs to the terminal device, in response to receiving a program acquisition request to acquire the plurality of programs.

16. The distribution method according to claim 15, further comprising:
accessing, by the distribution server, a group management database that manages a group into which the plurality of programs are grouped, and that indicates an activation order of the plurality of programs within the group, when a group information acquisition request is received from the terminal device; and
sending, by the distribution server, to the terminal device, group information indicating a program to be immediately activated among the plurality of the programs in the group, and causing the terminal device to make, with priority, an acquisition request to acquire the leading part of the program to be immediately activated.

17. The distribution method according to claim 15, further comprising:
reducing, by the distribution server, a size of the leading part as the activation order is higher, based on the activation order within the group.

18. The distribution method according to claim 15, further comprising:
increasing, by the distribution server, a number of bands to be assigned as the activation order is higher, based on the activation order within the group.

19. The distribution method according to claim 15, further comprising:
monitoring, by the distribution server, a passage of time from after a first leading part of one of the plurality of programs is sent, and recreating the at least one remaining part to have a larger size, when the one of the plurality of programs relevant to the first leading part is not activated after a predetermined time has passed.

20. A resource acquisition method executed by a computer, the resource acquisition method comprising:
downloading, by a terminal device connected to a distribution server via a network, from the distribution server, a plurality of division parts obtained by dividing a program, after a program acquisition request is sent to the distribution server;
displaying, by the terminal device, a top page on a display screen by activating a leading part that is first downloaded from the distribution server among the plurality of division parts, wherein the leading part is activated with link information included in the leading part to indicate a location of a resource of a page linked from the top page, the link information when received from the distribution server indicating a web address of the resource in the distribution server on the network;
acquiring, by the terminal device, the resource of the top-page-linked page from the distribution server, when one of the plurality of division parts including the resource is not completely downloaded, after a resource acquisition request relevant to the resource of the top-page-linked page is sent to the distribution server;
when the one of the plurality of division parts including the resource is completely downloaded,
rewriting, by the terminal device, the link information, included in the leading part to indicate the web address of the resource of the top-page-linked page in the distribution server on the network, into revised link information indicating a local address of the resource on the terminal device; and
displaying, by the terminal device, the top page again by activating the one of the plurality of division parts with the revised link information.

21. The resource acquisition method according to claim 20, further comprising:
sending, by the terminal device, the program acquisition request to the distribution server, after information relevant to a status of the network is attached to the program acquisition request.

22. The resource acquisition method according to claim 21, wherein the information relevant to the status of the network includes network status information indicating a line type of the network or a time to be taken for reception by the terminal device.

23. The resource acquisition method according to claim 20, further comprising:
receiving, by the terminal device, from the distribution server, the resource and part information relevant to the one of the plurality of division parts including the resource, after the resource acquisition request is sent to the distribution server; and
sending, by the terminal device, a program acquisition request relevant to the one of the plurality of division parts including the resource to the distribution server, based on the part information.

24. The resource acquisition method according to claim 20, further comprising:
receiving, by the terminal device, the resource from the distribution server after the resource acquisition request is sent to the distribution server; and
receiving, by the terminal device, from the distribution server, the one of the plurality of division parts and part information relevant to the one of the plurality of division parts including the resource, after a program acquisition request relevant to the one of the plurality of division parts including the resource is sent to the distribution server;
wherein the program acquisition request relevant to the one of the plurality of division parts including the resource is sent to the distribution server with priority, which is specified by the part information.

25. The resource acquisition method according to claim 20, further comprising:
receiving, by the terminal device, with priority, a leading part of each of a plurality of programs from the distribution server, after a program acquisition request relevant to the plurality of programs is sent to the distribution server.

26. A distribution server connected to a terminal device via a network, the distribution server comprising:
a processor; and
a storage device storing a distribution program that, when executed by the processor, causes the distribution server to
divide, in response to receiving a program acquisition request from the terminal device, a program into a leading part that activates the program and at least one remaining part other than the leading part;
rewrite link information included in the leading part to indicate a location of a resource of a page linked from a top page, to be displayed on the terminal device by the leading part, into revised link information indicating a web address of the resource in the distribution server on the network; and transfer the leading part to the terminal device, with priority higher than that of the at least one remaining part, wherein, when the leading part is transferred to the terminal device, activating the leading part with the revised link information at the terminal device, acquiring the resource of the top-page-linked page from the distribution server via the network, and displaying the top page with the acquired resource of the top-page-linked page before the at least one remaining part is transferred to the terminal device.

27. A terminal device connected to a distribution server via a network, the terminal device comprising:

a processor; and a storage device storing a resource acquisition program that, when executed by the processor causes the terminal device to download, from the distribution server, a plurality of division parts obtained by dividing a program, after a program acquisition request is sent to the distribution server, display a top page on a display screen by activating a leading part that is first downloaded from the distribution server among the plurality of division parts, wherein the leading part is activated with link information included in the leading part to indicate a location of a resource of a page linked from the top page, the link information when received from the distribution server indicating a web address of the resource in the distribution server on the network, acquire the resource of the top-page-linked page from the distribution server, when one of the plurality of division parts including the resource is not completely downloaded, after a resource acquisition request relevant to the resource of the top-page-linked page is sent to the distribution server, when the one of the plurality of division parts including the resource is completely downloaded, rewrite the link information, included in the leading part to indicate the web address of the resource of the top-page-linked page in the distribution server on the network, into revised link information indicating a local address of the resource on the terminal device; and display the top page again by activating the one of the plurality of division parts with the revised link information.

28. A non-transitory computer-readable recording medium storing a distribution program that causes a computer to execute a process, the process comprising:

dividing, by a distribution server connected to a terminal device via a network, a program in response to receiving a program acquisition request from the terminal device; and transferring, by the distribution server, the divided program to the terminal device, wherein the dividing includes dividing, by the distribution server, the program into a leading part that activates the program and at least one remaining part other than the leading part, and rewriting, by the distribution server, link information included in the leading part to indicate a location of a resource of a page linked from a top page, to be displayed on the terminal device by the leading part, into revised link information indicating a web address of the resource in the distribution server on the network, wherein the transferring includes transferring, by the distribution server, the leading part to the terminal device, with priority higher than that of the at least one remaining part, and wherein, when the leading part is transferred to the terminal device, activating the leading part with the revised link information at the terminal device, acquiring the resource of the top-page-linked page from the distribution server via the network, and displaying the top page with the acquired resource of the top-page-linked page before the at least one remaining part is transferred to the terminal device.

29. A non-transitory computer-readable recording medium storing a resource acquisition program that causes a computer to execute a process, the process comprising:

downloading, by a terminal device connected to a distribution server via a network, from the distribution server, a plurality of division parts obtained by dividing a program, after a program acquisition request is sent to the distribution server;

displaying, by the terminal device, a top page on a display screen by activating a leading part that is first downloaded from the distribution server among the plurality of division parts, wherein the leading part is activated with link information included in the leading part to indicate a location of a resource of a page linked from the top page, the link information when received from the distribution server indicating a web address of the resource in the distribution server on the network;

acquiring, by the terminal device, the resource of the top-page-linked page from the distribution server, when one of the plurality of division parts including the resource is not completely downloaded, after a resource acquisition request relevant to the resource of the top-page-linked page is sent to the distribution server;

when the one of the plurality of division parts including the resource is completely downloaded, rewriting, by the terminal device, the link information, included in the leading part to indicate the web address of the resource of the top-page-linked page in the distribution server on the network, into revised link information indicating a local address of the resource on the terminal device; and displaying, by the terminal device, the top page again by activating the one of the plurality of division parts with the revised link information.

* * * * *